US008572226B2

(12) United States Patent
Moser

(10) Patent No.: US 8,572,226 B2
(45) Date of Patent: Oct. 29, 2013

(54) ENHANCING NETWORK DETAILS USING NETWORK MONITORING SCRIPTS

(75) Inventor: Martin Moser, Speyer (DE)

(73) Assignee: SAP AG, Walldorf (DE)

( * ) Notice: Subject to any disclaimer, the term of this patent is extended or adjusted under 35 U.S.C. 154(b) by 579 days.

(21) Appl. No.: 12/337,084

(22) Filed: Dec. 17, 2008

(65) Prior Publication Data

US 2010/0153529 A1 Jun. 17, 2010

(51) Int. Cl.
- *G06F 15/173* (2006.01)
- *G06F 3/00* (2006.01)
- *H04W 72/00* (2009.01)
- *H04B 7/00* (2006.01)

(52) U.S. Cl.
USPC ........... 709/223; 715/704; 455/450; 455/464; 455/509

(58) Field of Classification Search
USPC .......................................... 709/223
See application file for complete search history.

(56) References Cited

U.S. PATENT DOCUMENTS

| | | | | |
|---|---|---|---|---|
| 5,974,572 | A * | 10/1999 | Weinberg et al. | 714/47.2 |
| 6,438,592 | B1 * | 8/2002 | Killian | 709/224 |
| 6,560,564 | B2 * | 5/2003 | Scarlat et al. | 702/186 |
| 6,587,969 | B1 * | 7/2003 | Weinberg et al. | 714/46 |
| 6,988,221 | B2 * | 1/2006 | Rasmussen et al. | 714/12 |
| 7,133,805 | B1 * | 11/2006 | Dankenbring et al. | 702/186 |
| 7,197,559 | B2 * | 3/2007 | Goldstein et al. | 709/224 |
| 7,412,349 | B2 | 8/2008 | Moser et al. | |
| 7,480,767 | B2 | 1/2009 | Moser | |
| 7,509,584 | B2 | 3/2009 | Moser | |
| 7,516,042 | B2 * | 4/2009 | Glas et al. | 702/182 |
| 7,555,449 | B2 | 6/2009 | Moser et al. | |
| 7,676,542 | B2 | 3/2010 | Moser et al. | |
| 7,703,015 | B2 | 4/2010 | McKellar et al. | |
| 2002/0177977 | A1 * | 11/2002 | Scarlat et al. | 702/186 |
| 2003/0217331 | A1 | 11/2003 | McKellar et al. | |
| 2004/0107249 | A1 | 6/2004 | Moser et al. | |
| 2005/0268243 | A1 | 12/2005 | Moser | |
| 2005/0283423 | A1 | 12/2005 | Moser et al. | |
| 2006/0085166 | A1 * | 4/2006 | Ochi et al. | 702/186 |
| 2006/0143227 | A1 | 6/2006 | Helm et al. | |
| 2006/0200535 | A1 | 9/2006 | Moser | |
| 2007/0136024 | A1 | 6/2007 | Moser et al. | |
| 2007/0147596 | A1 | 6/2007 | Moser | |
| 2007/0162913 | A1 | 7/2007 | Moser | |
| 2007/0266149 | A1 * | 11/2007 | Cobb et al. | 709/224 |
| 2007/0294480 | A1 | 12/2007 | Moser | |
| 2008/0126765 | A1 | 5/2008 | Moser et al. | |
| 2009/0299680 | A1 * | 12/2009 | Gibbs | 702/119 |
| 2010/0042970 | A1 * | 2/2010 | Gibbs | 717/106 |
| 2010/0088404 | A1 * | 4/2010 | Mani et al. | 709/224 |

* cited by examiner

*Primary Examiner* — Guang Li

(74) *Attorney, Agent, or Firm* — Fish & Richardson P.C.

(57) ABSTRACT

In some implementations, a method includes receiving a request to execute a plurality of transactions with an application of a server to evaluate one or more services using an executed LoadRunner script. In response to the service request, the plurality of transactions are automatically executed with the application using the LoadRunner script populated with values of variables transmitted between the application and a client during at least one transaction previously executed with the client. Values of the variables transmitted between the application and the executed LoadRunner script are determined during execution of the plurality of transactions.

11 Claims, 34 Drawing Sheets

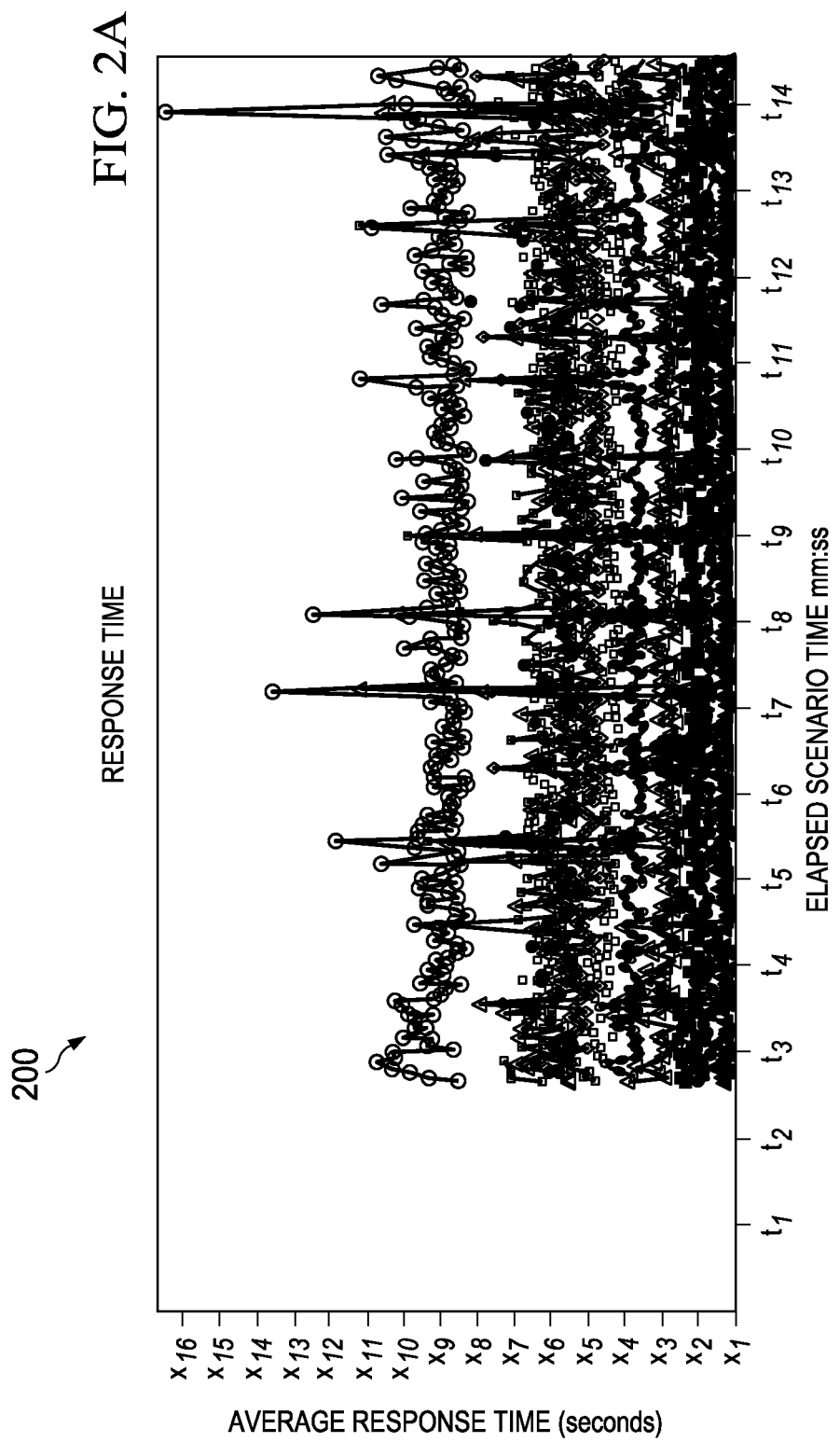

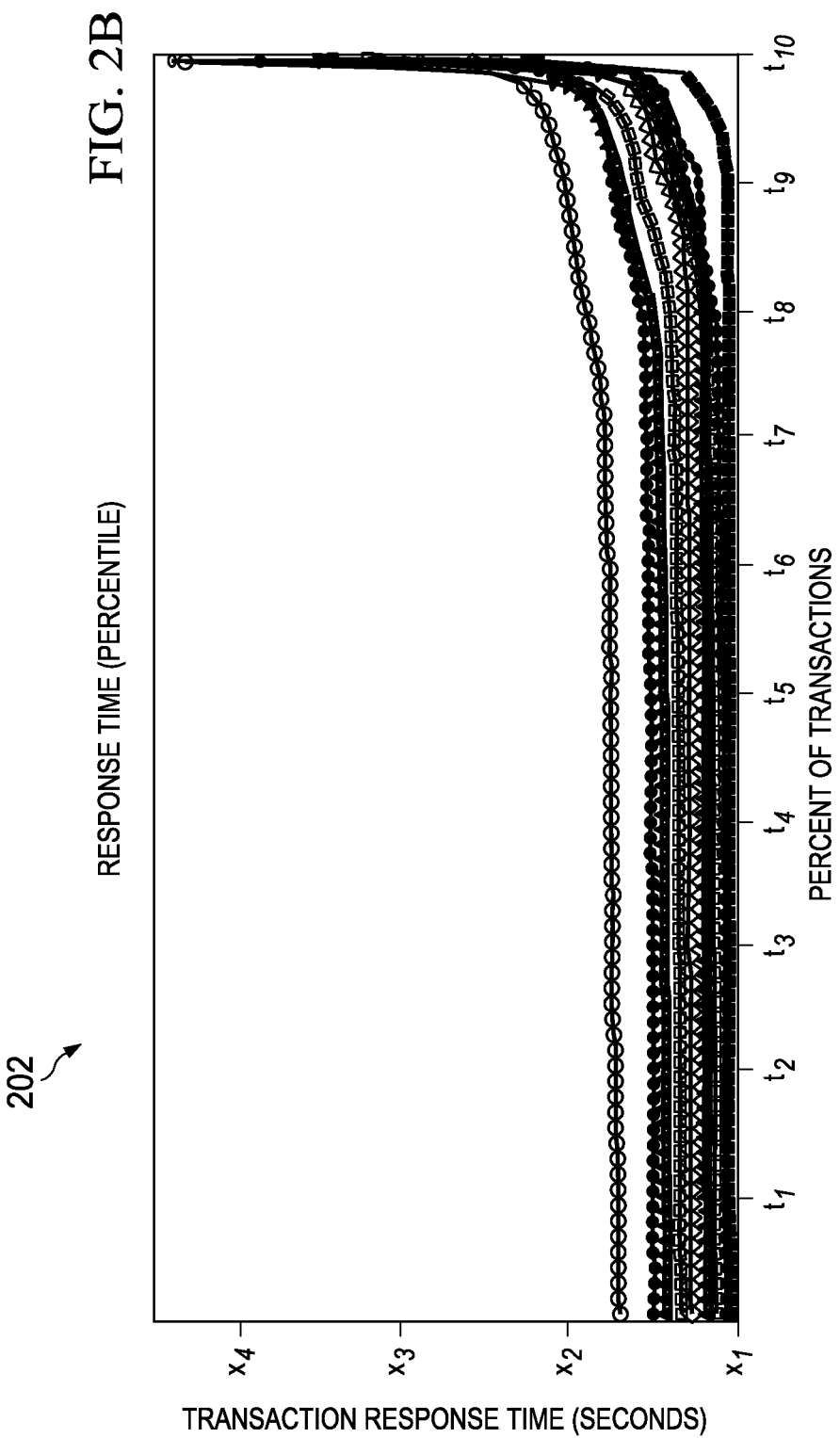

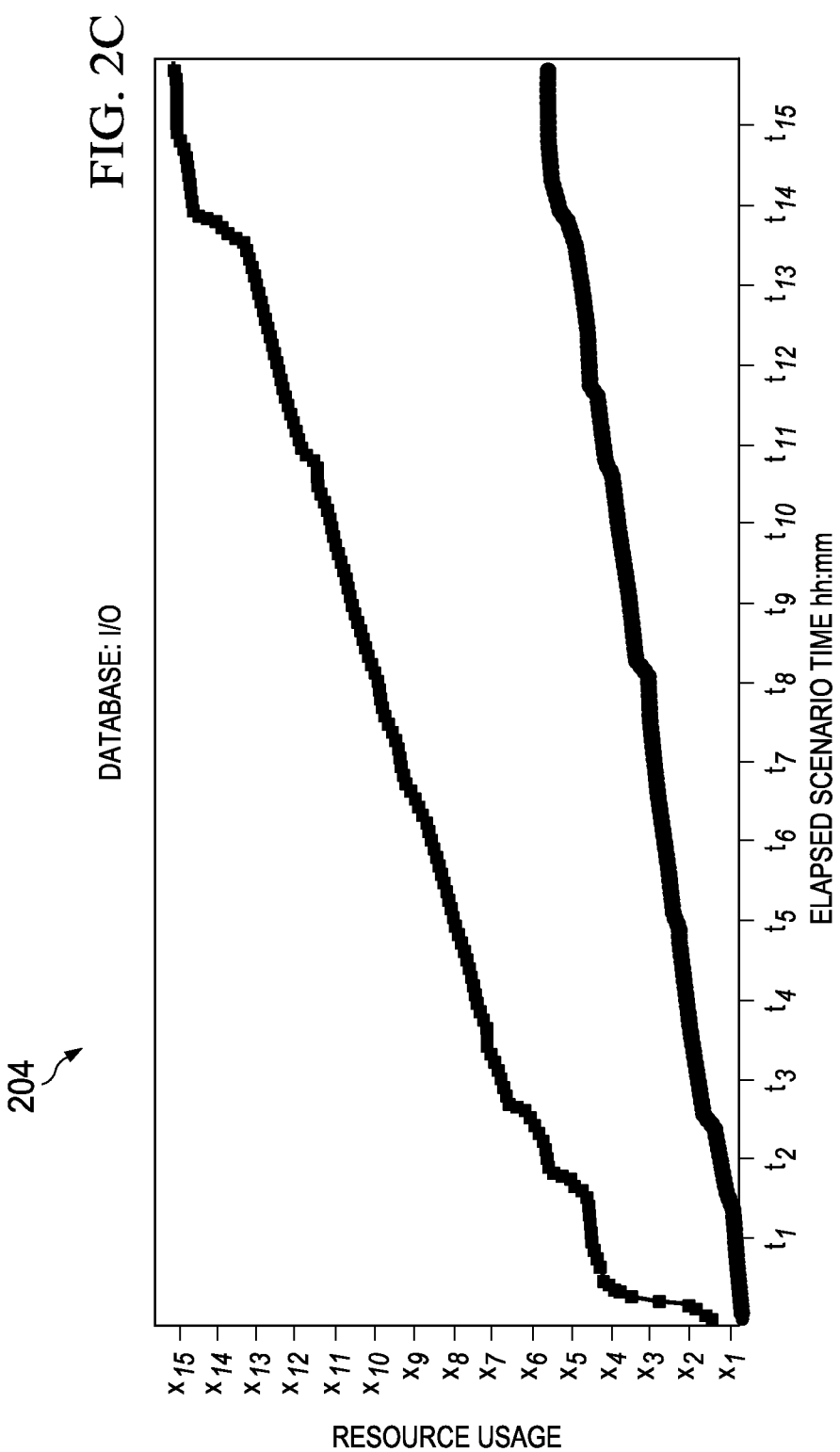

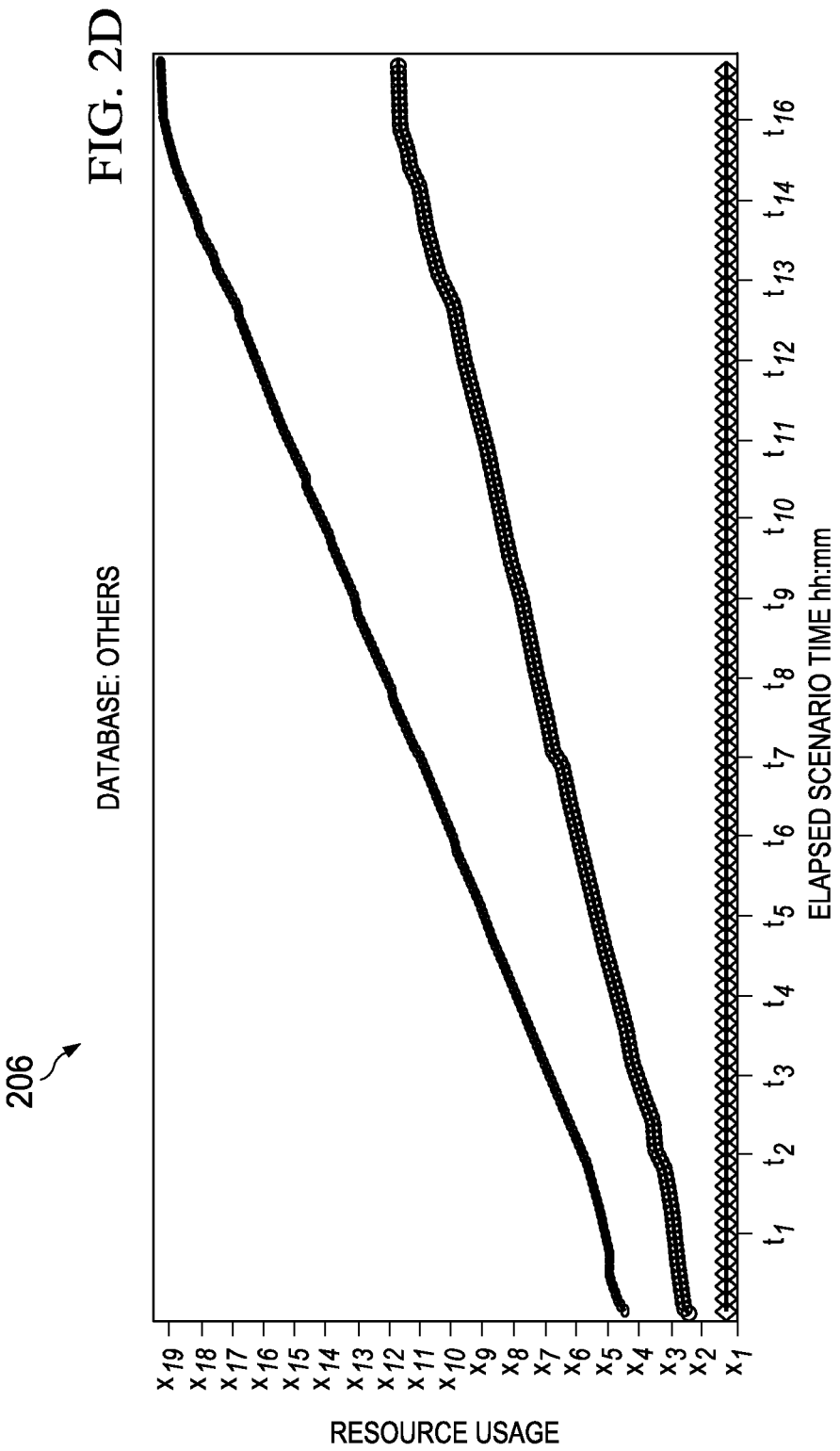

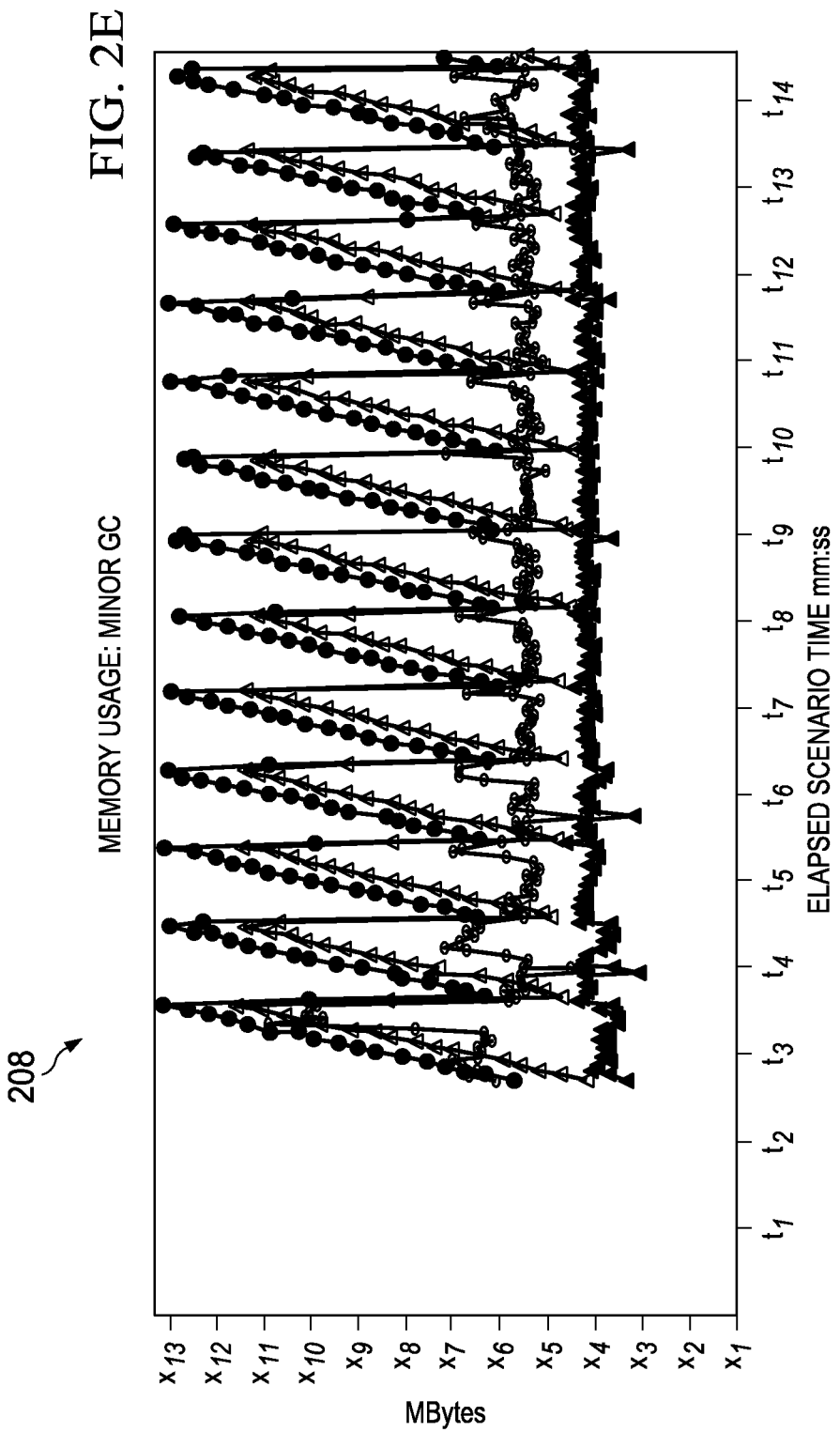

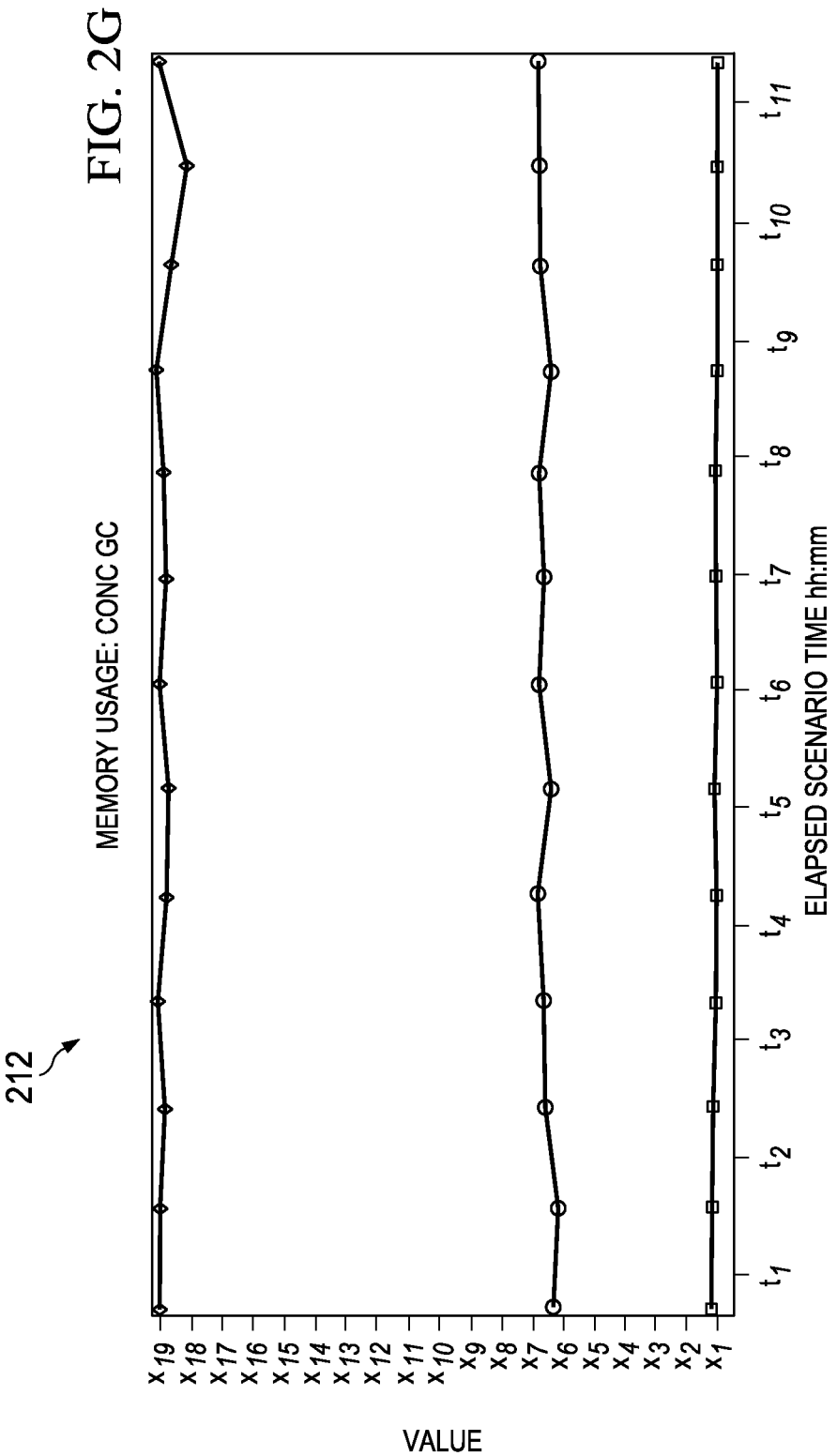

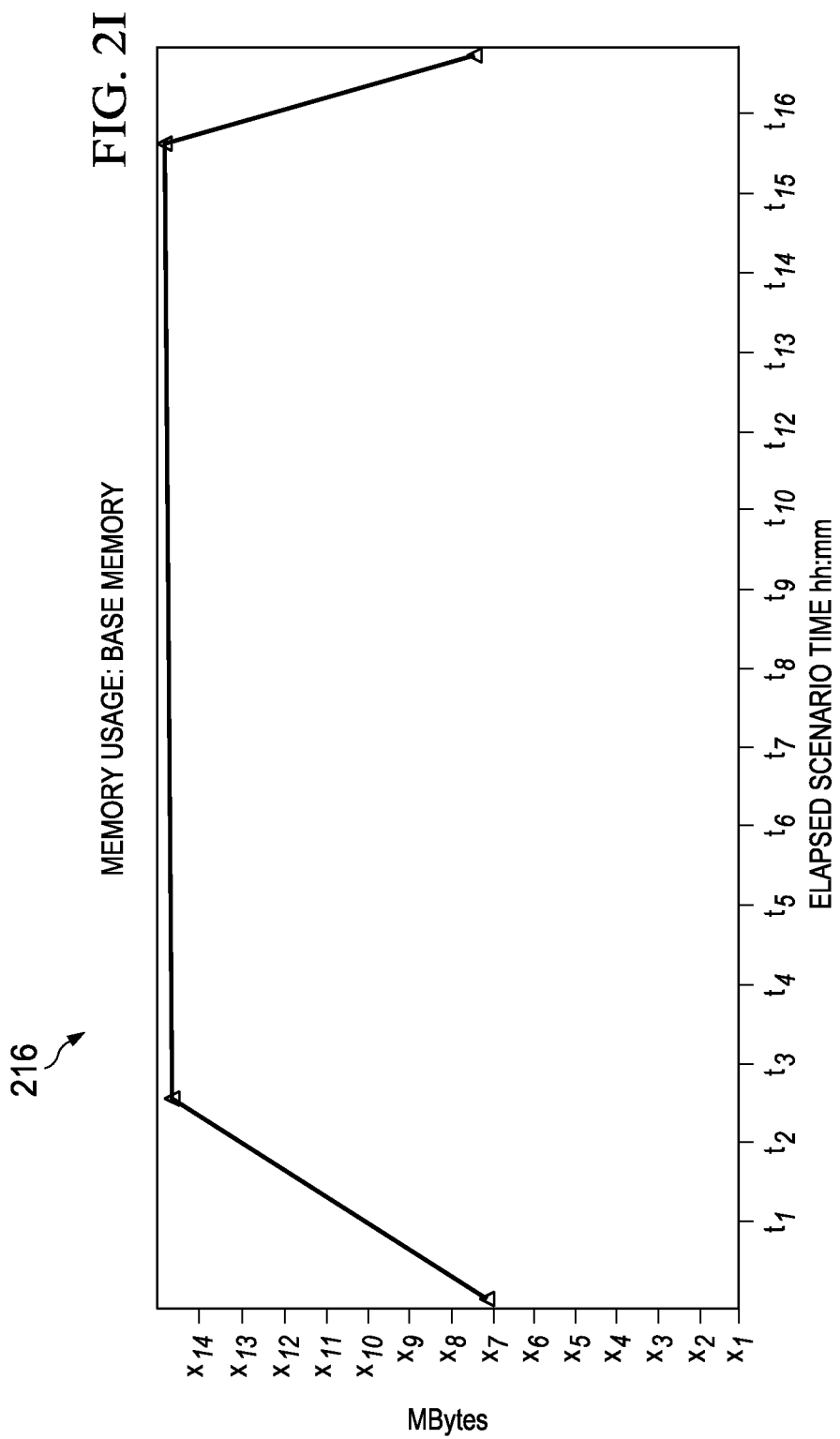

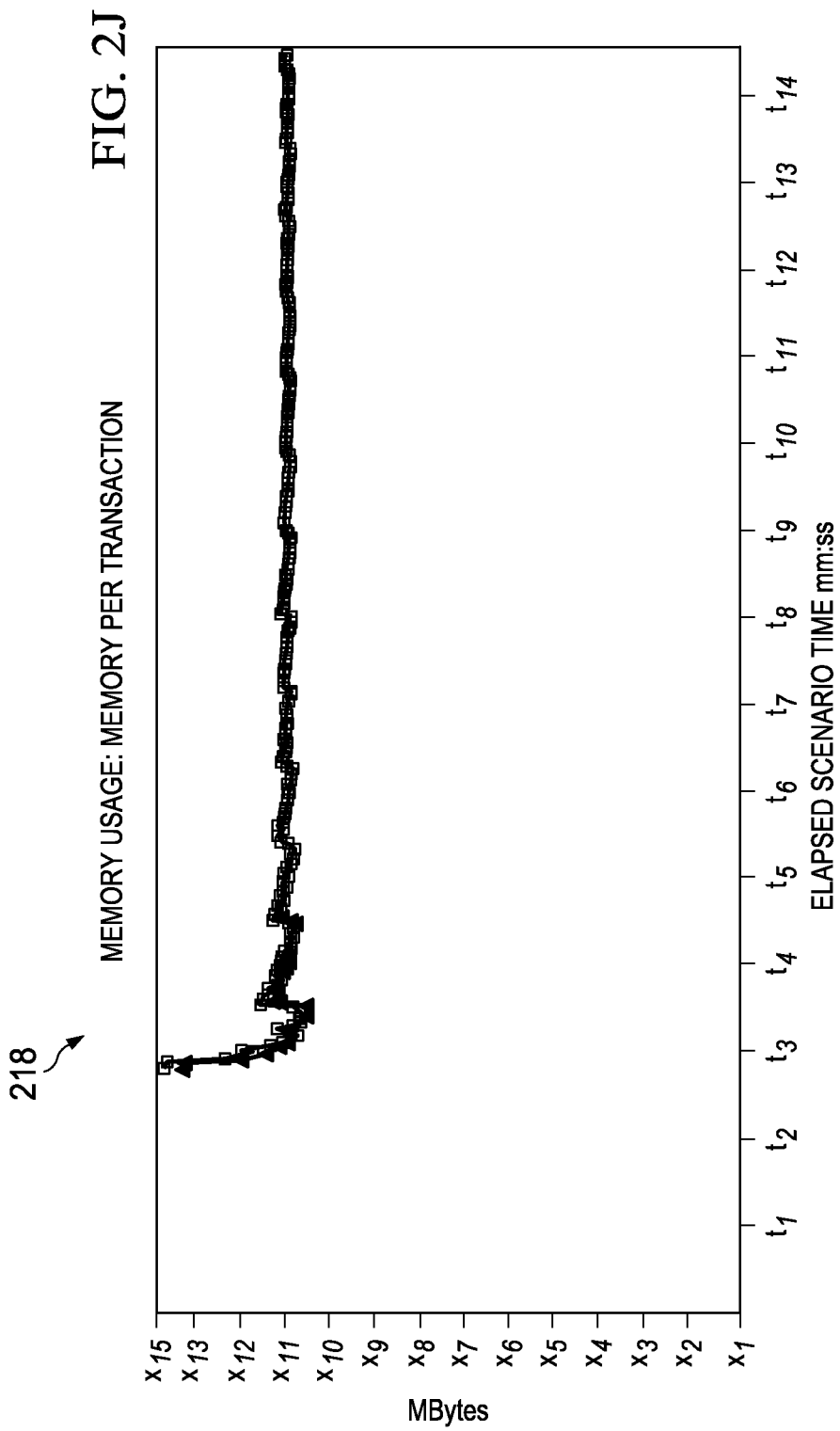

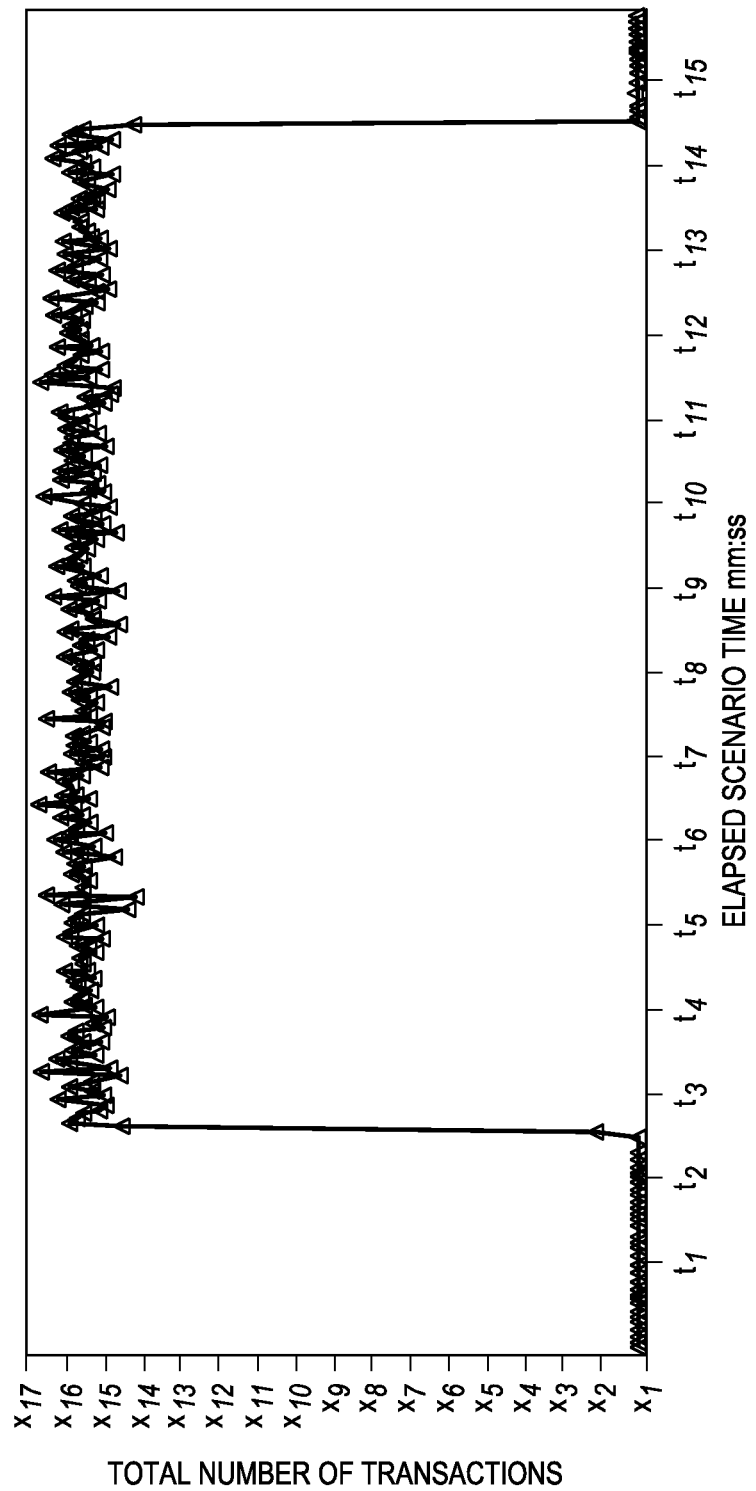

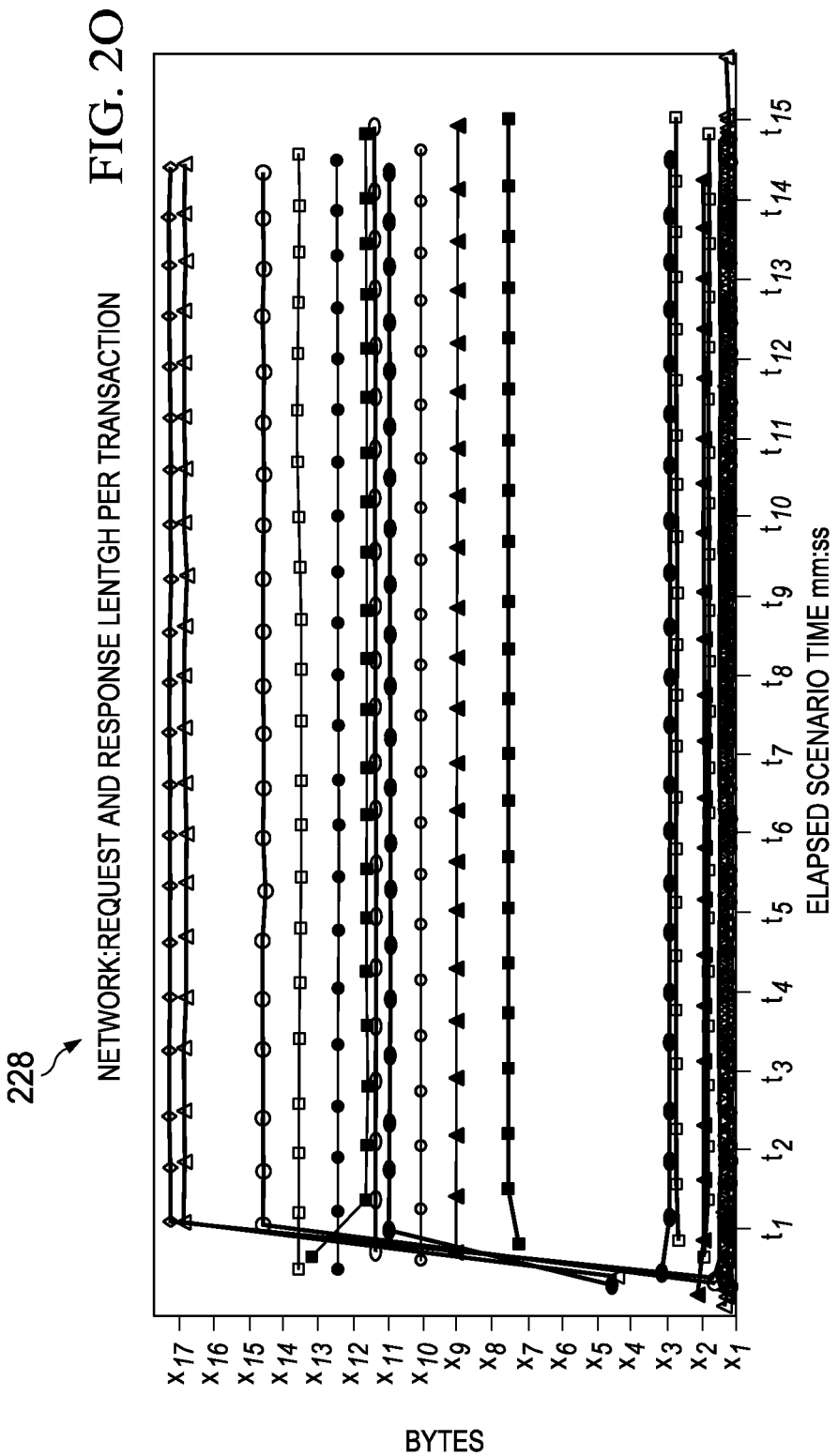

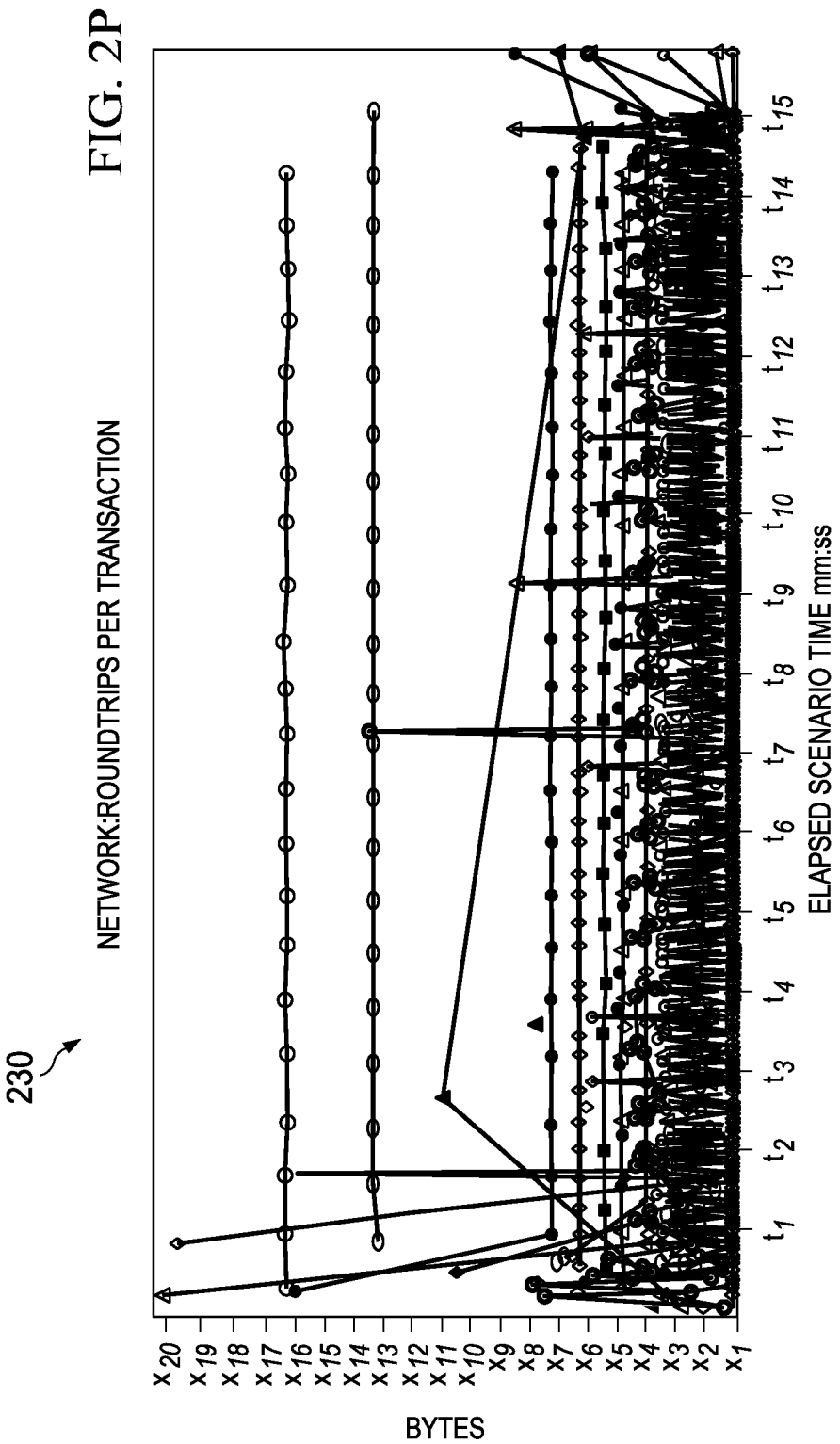

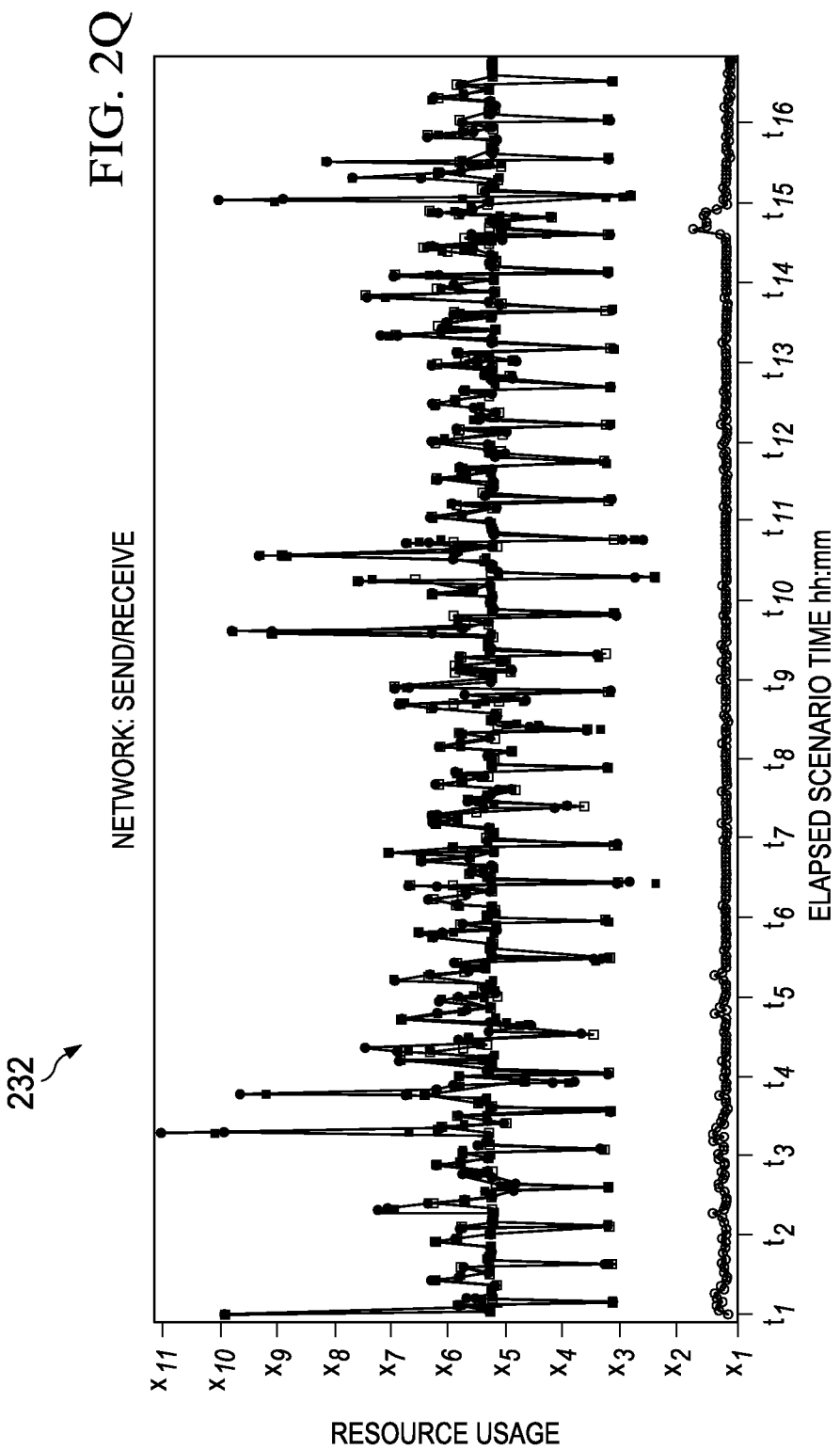

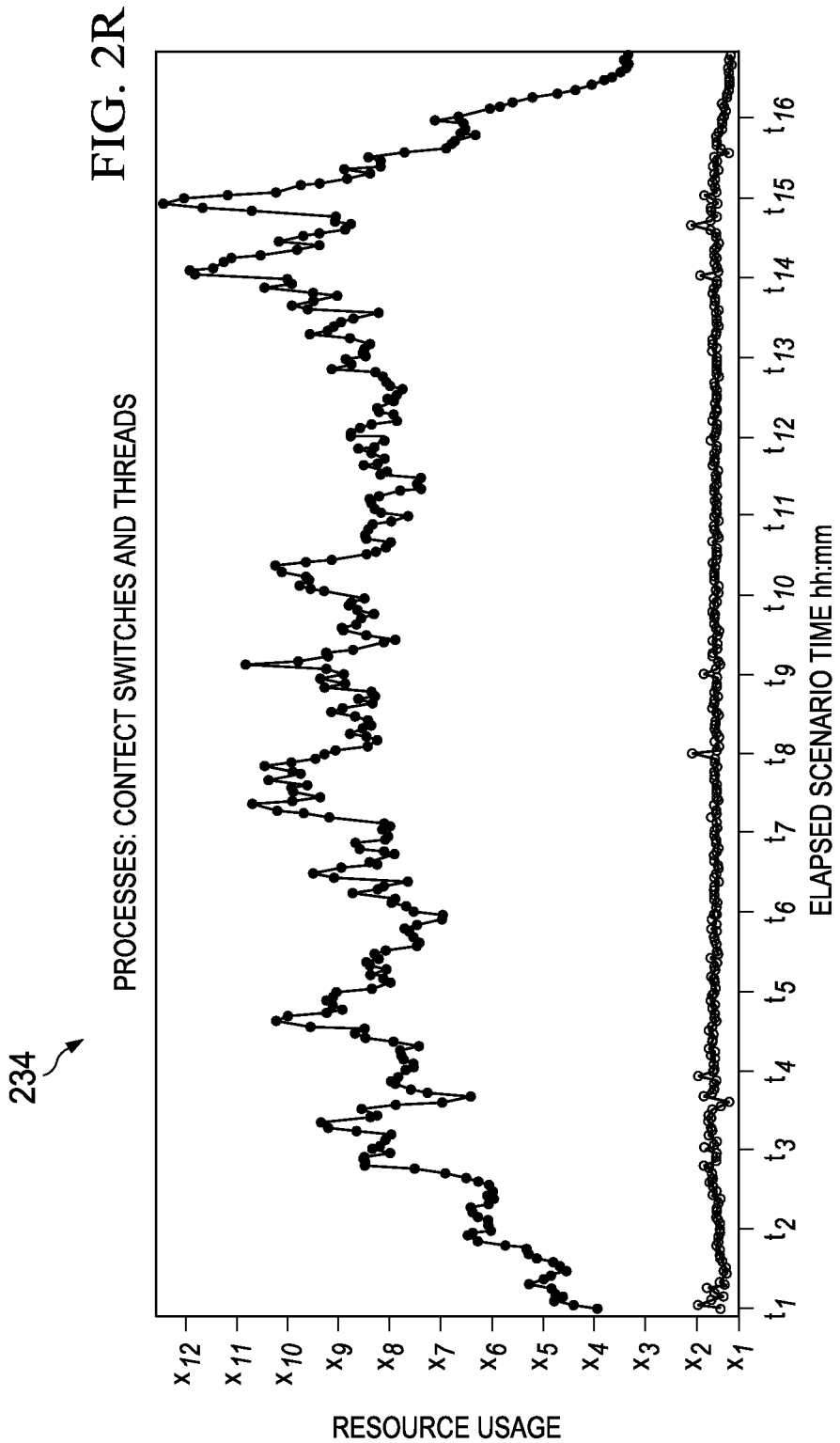

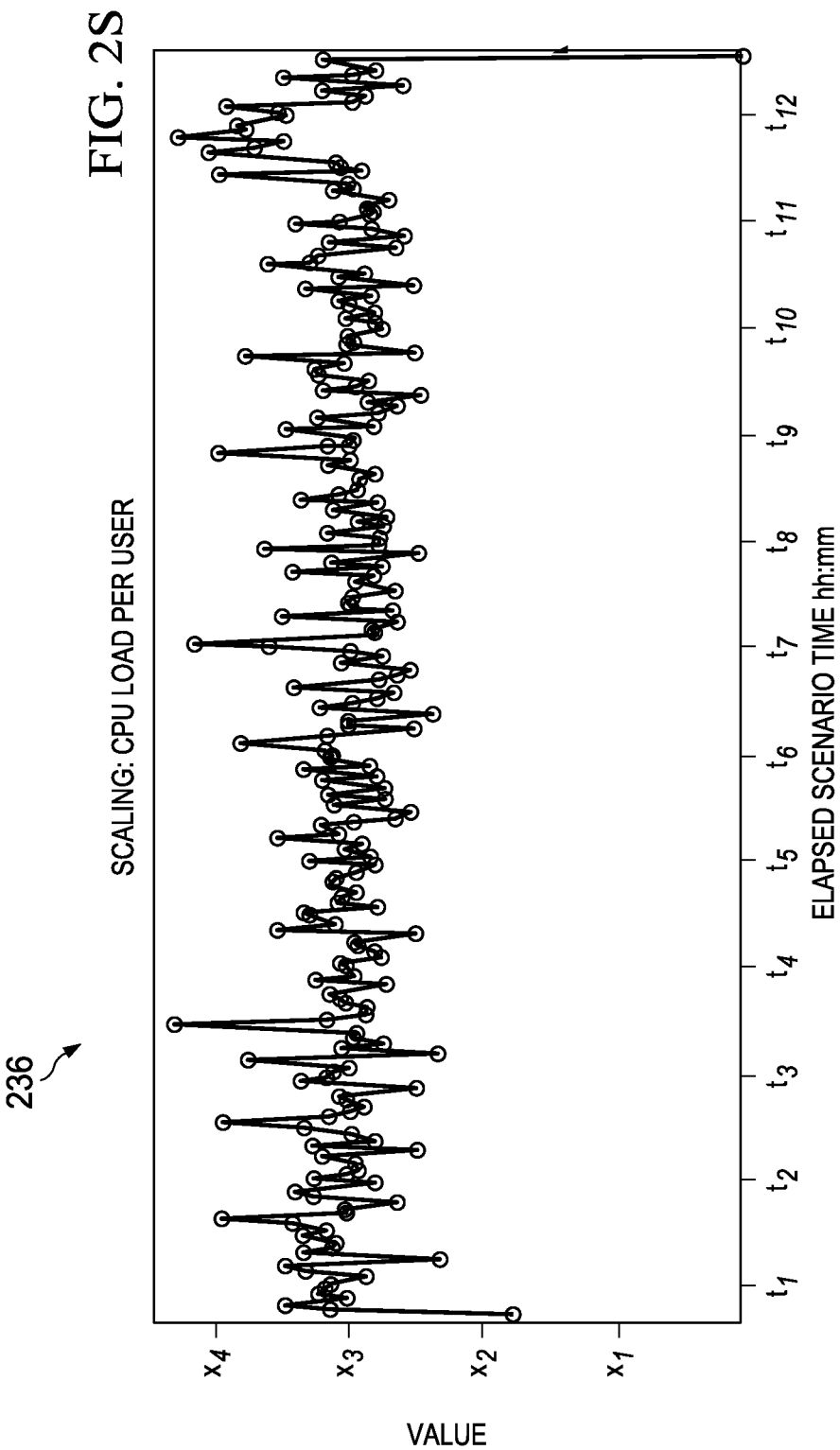

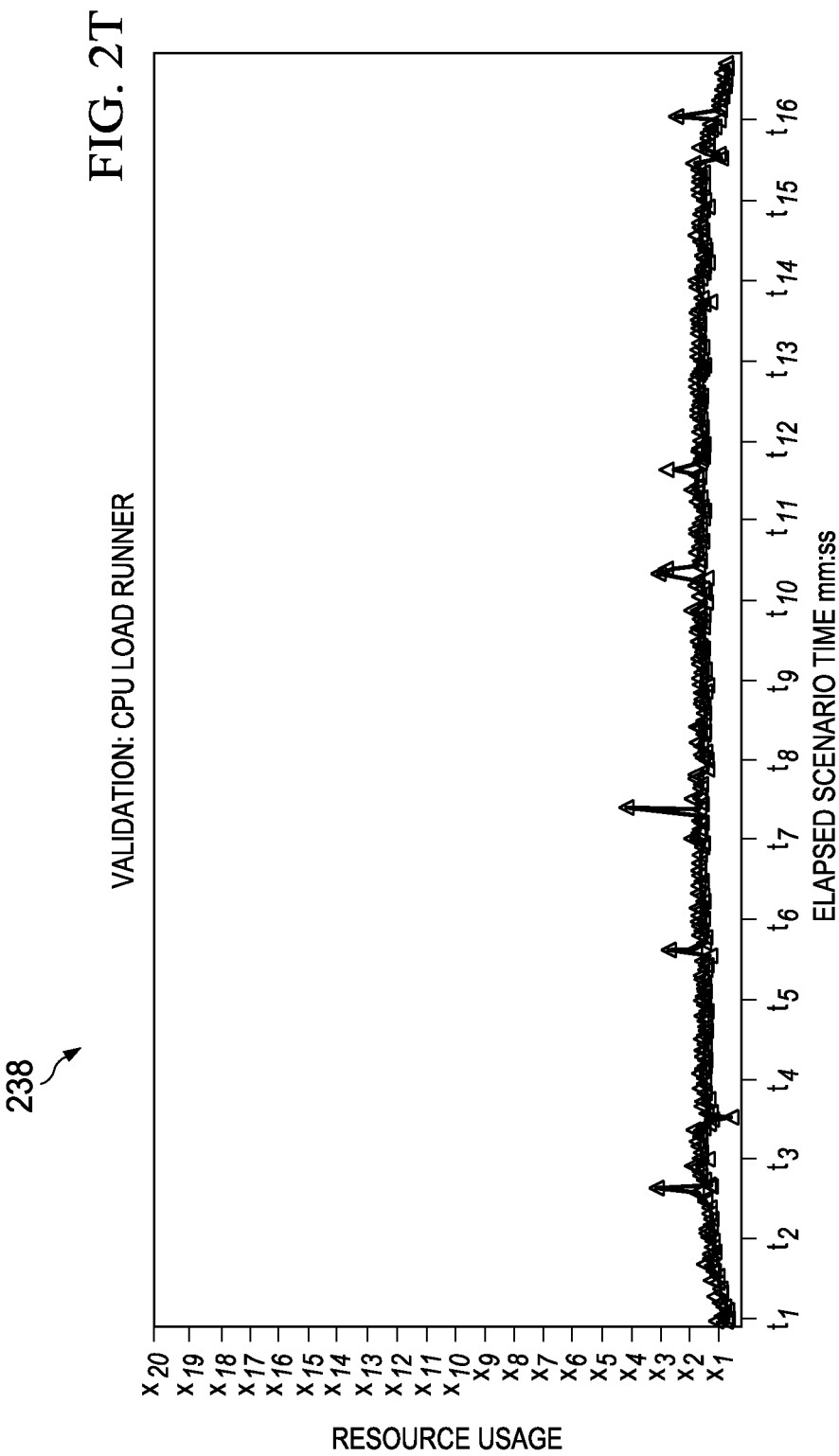

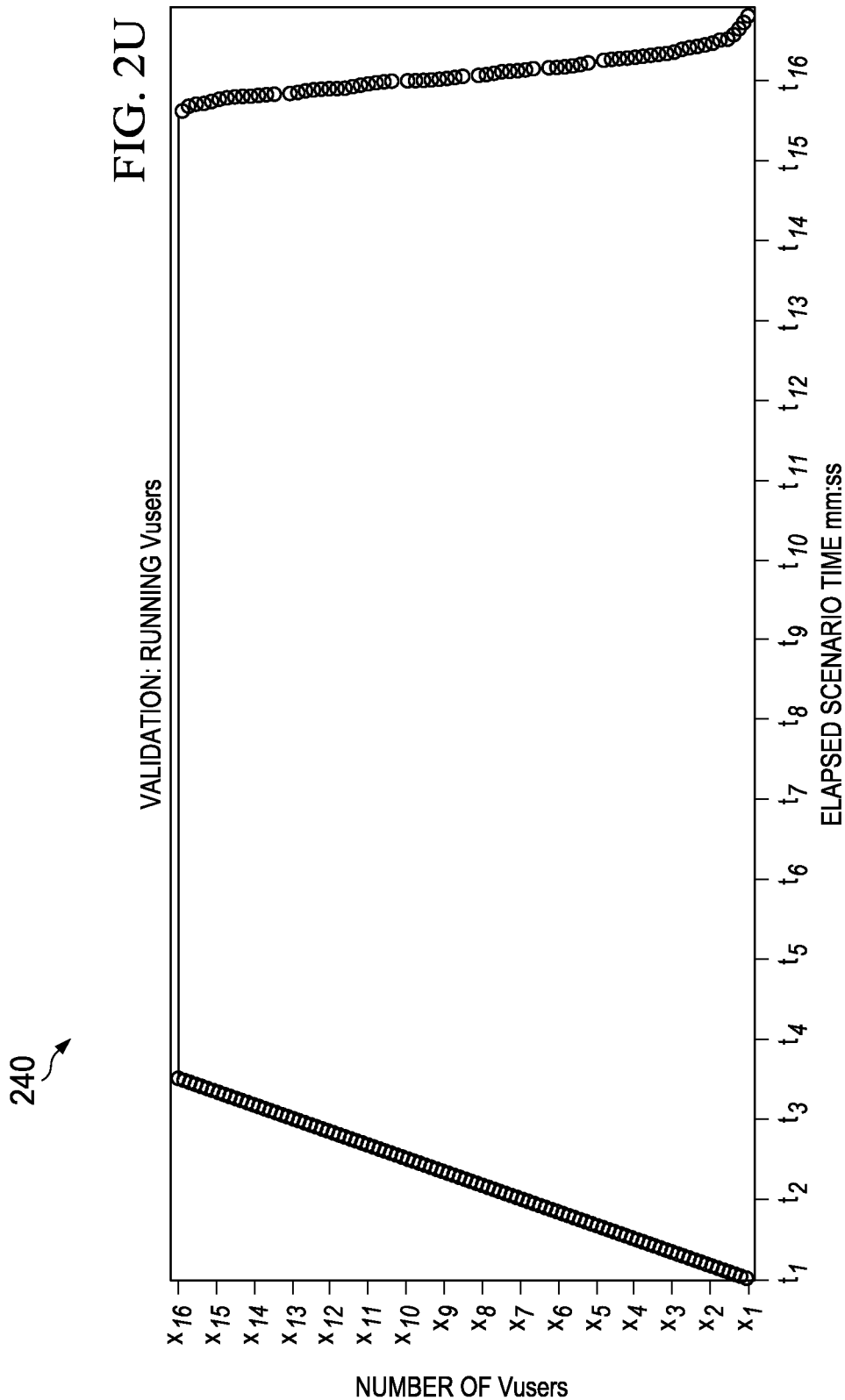

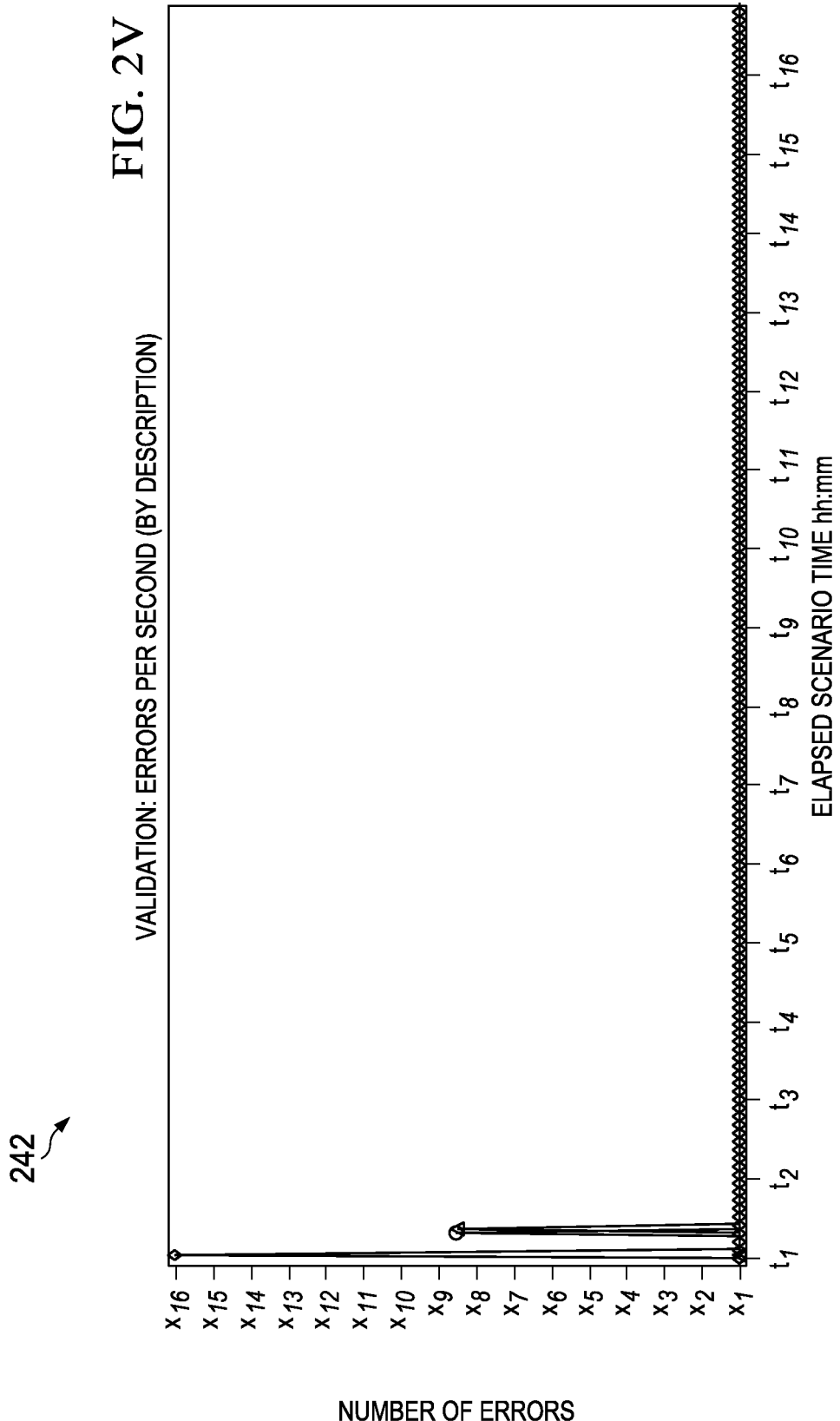

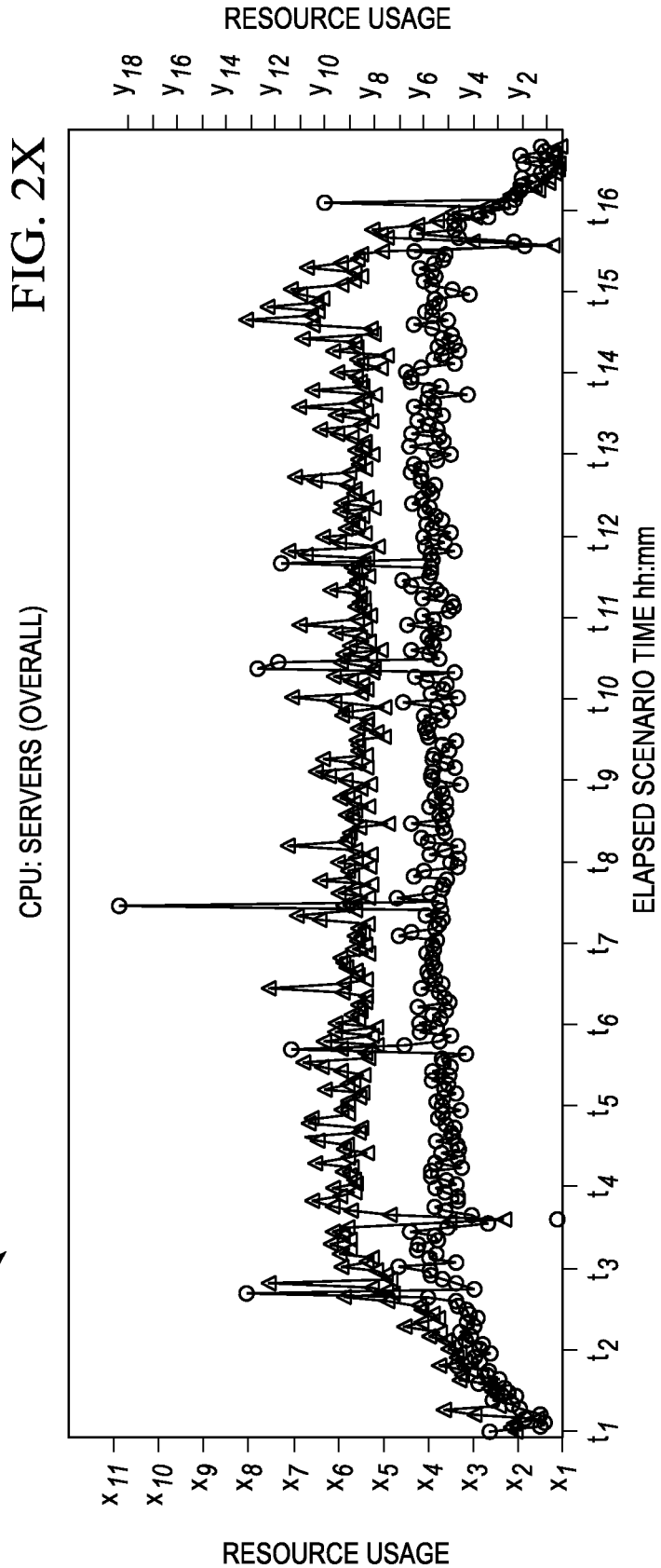

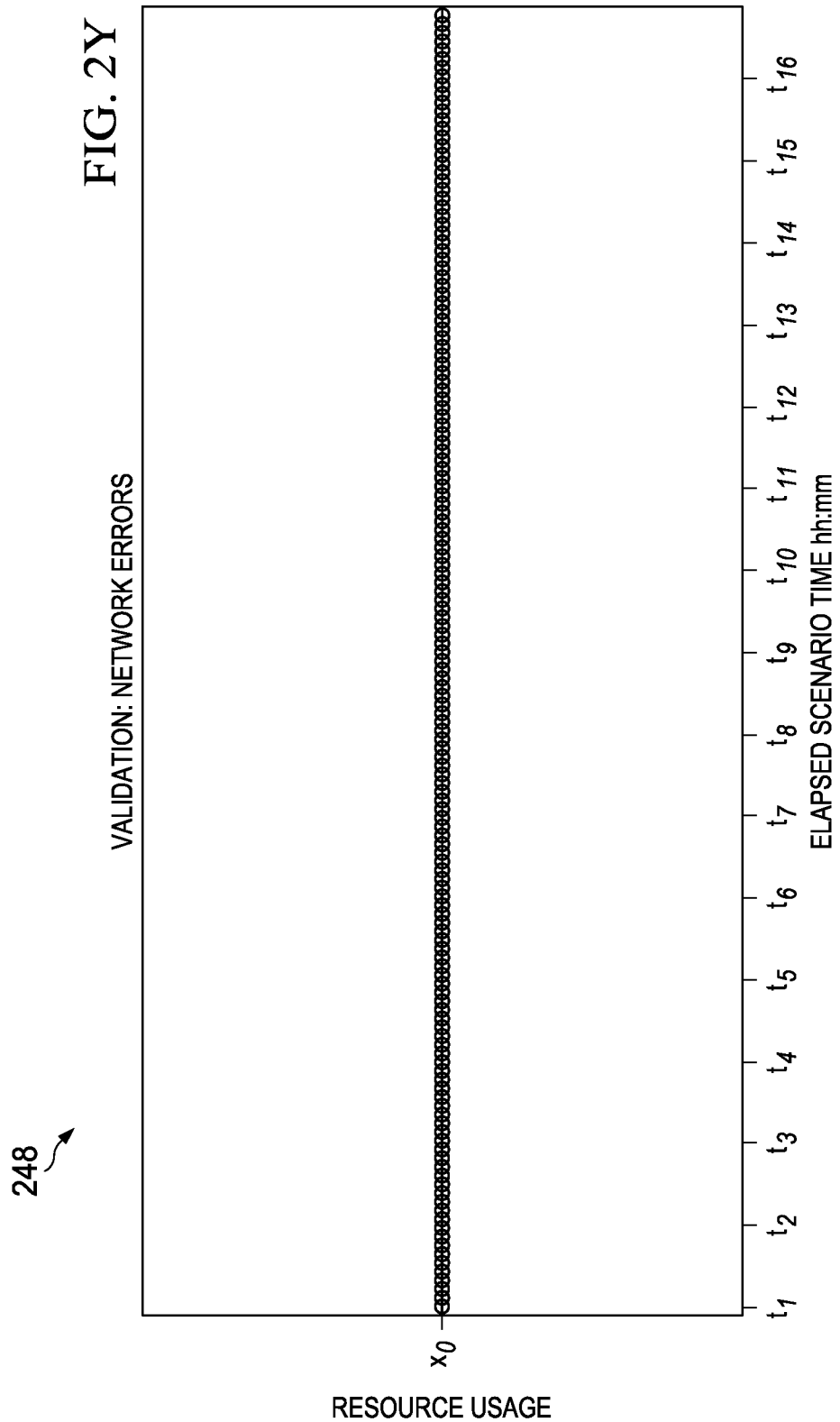

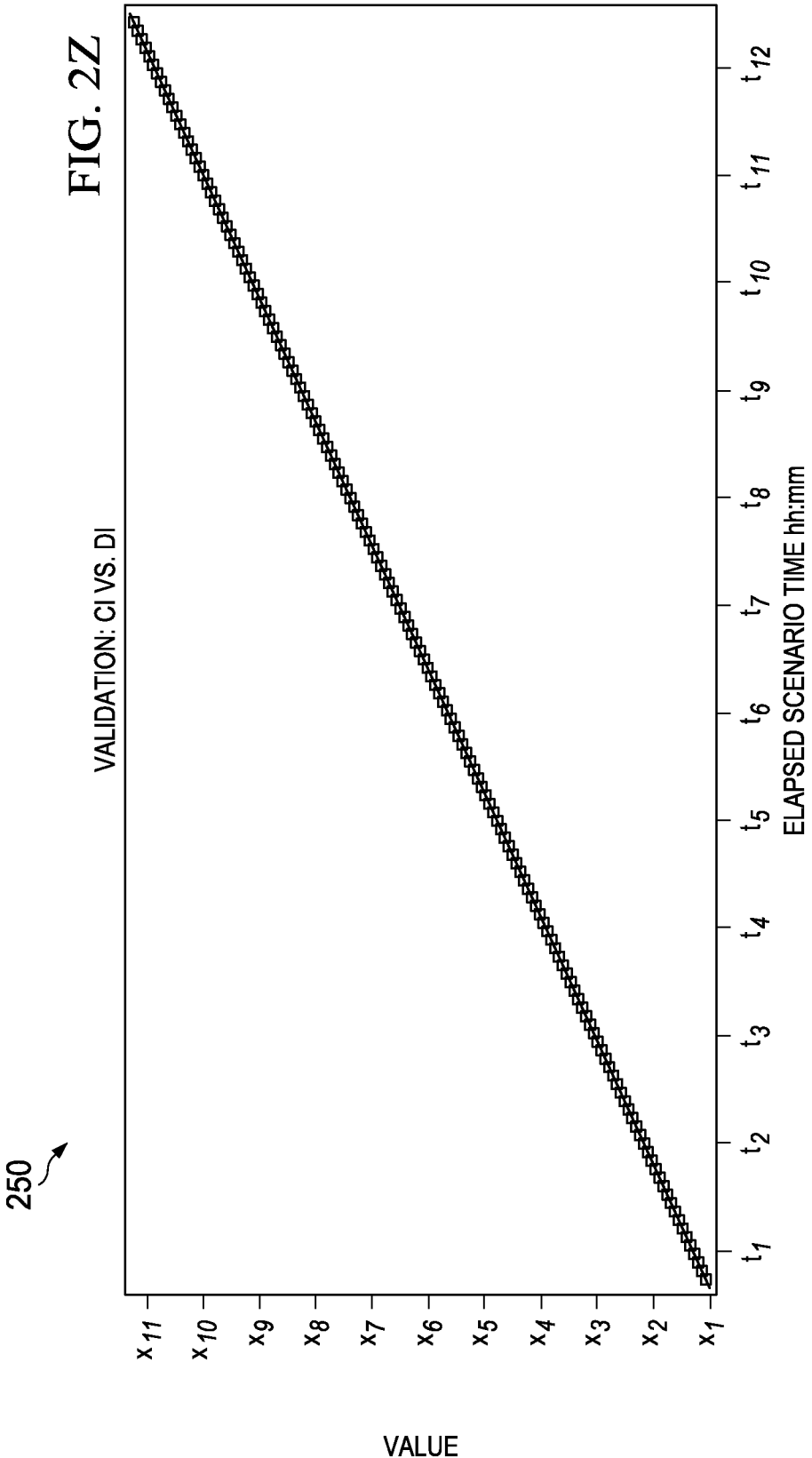

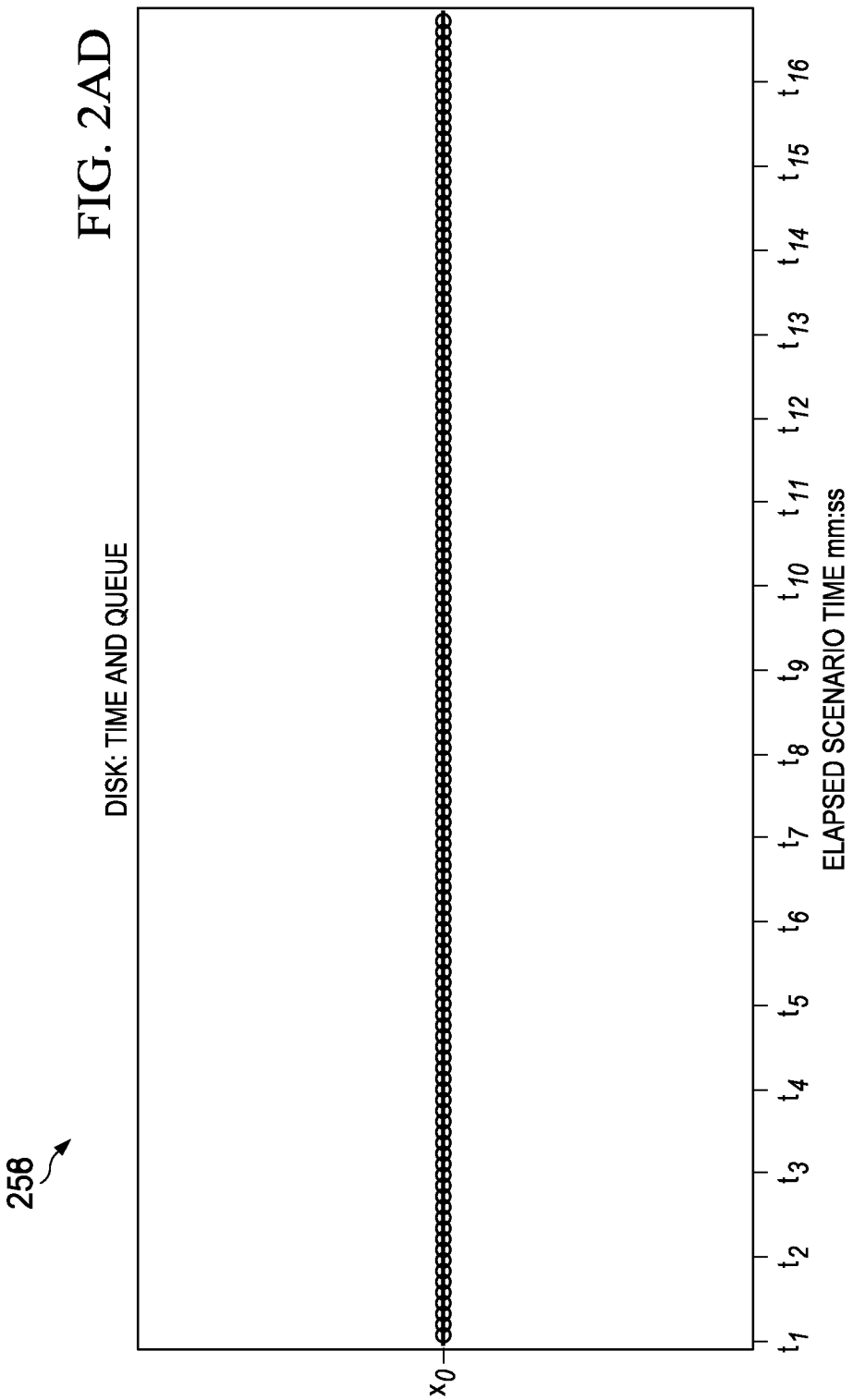

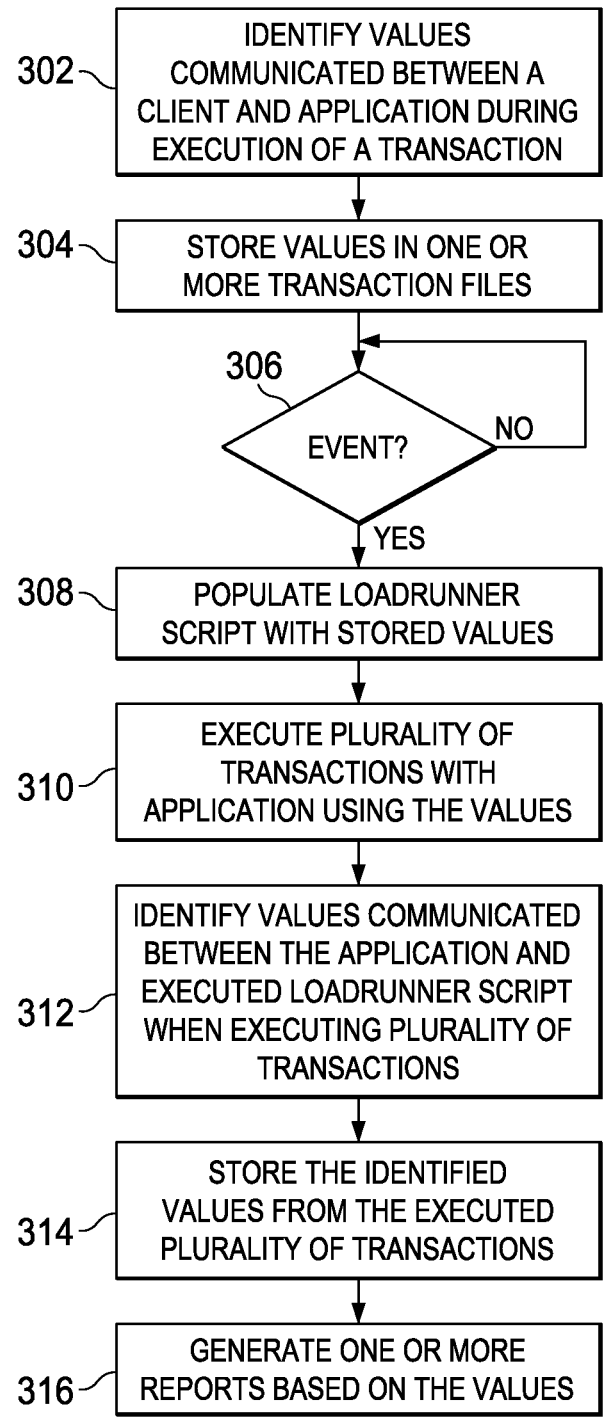

ENHANCING NETWORK DETAILS USING NETWORK MONITORING SCRIPTS

TECHNICAL FIELD

This disclosure relates to evaluating systems, software, and computer implemented methods and, more particularly, to enhancing network details using network monitoring scripts.

BACKGROUND

Load testing is a process by which a software application is tested under stress (or load) as the software application will be experiencing during real-time operation environment. Typically, software applications are tested in a fashion similar to the manner that the software application will be used in the operating environment of the customers. Hence, a test engineer tried to understand how a human user would use the software application, and then devises a method on how the human usage can be automated through the use of a software testing or network monitoring tool, such as LoadRunner manufactured by Hewlett Packard (HP) and previously Mercury Interactive. In these configurations, the software developer or tester would provide a number of test network transactions and other traffic that mimic real world situations.

SUMMARY

The present disclosure is directed to a system and method for enhancing network details using network monitoring scripts. In some implementations, a method includes receiving a request to execute a plurality of transactions with an application of a server to evaluate one or more services using an executed LoadRunner script. In response to the service request, the plurality of transactions are automatically executed with the application using the LoadRunner script populated with values of variables transmitted between the application and a client during at least one transaction previously executed with the client. Values of the variables transmitted between the application and the executed LoadRunner script are determined during execution of the plurality of transactions.

While generally described as computer implemented software that processes and transforms the respective data, some or all of the aspects may be computer implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 3 is a flowchart illustrating an example method for evaluation one or more applications.

DETAILED DESCRIPTION

Figure 1:
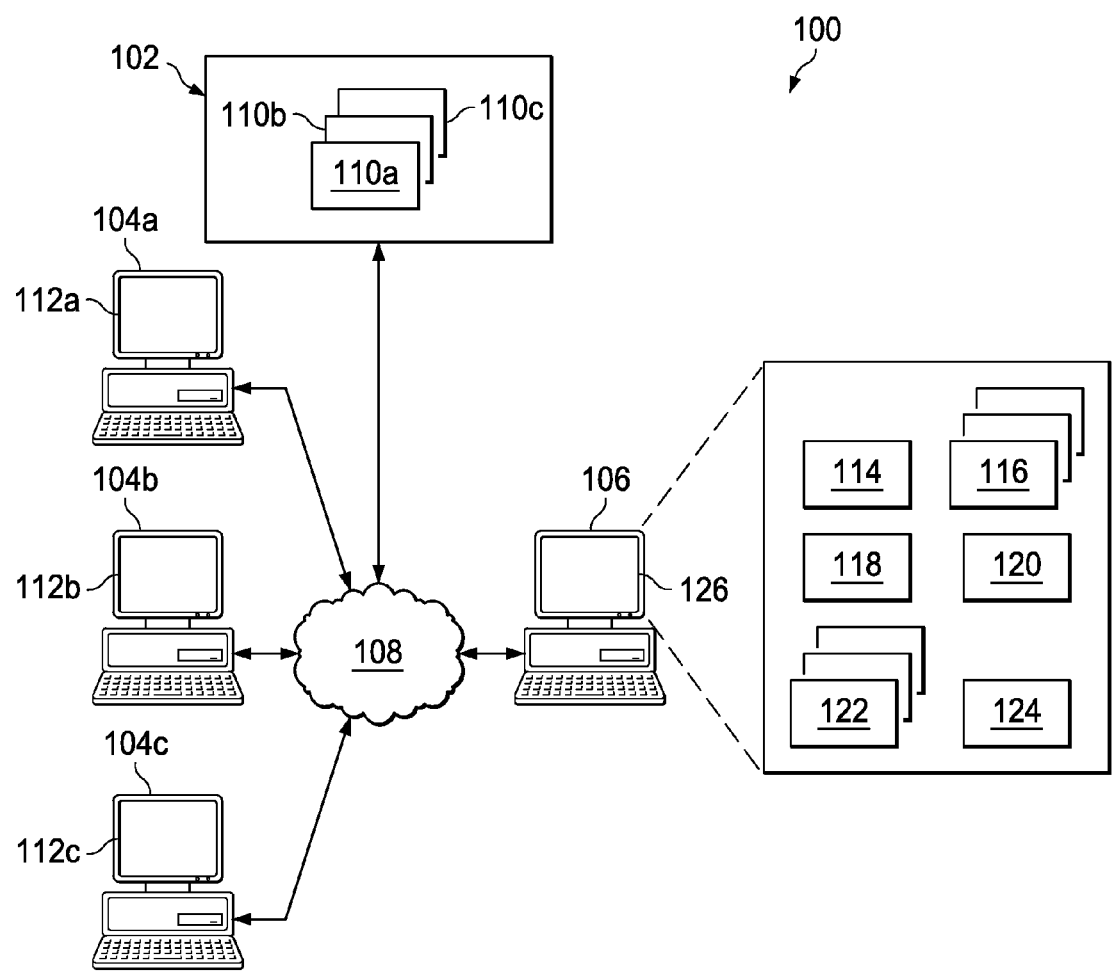
FIG. 1 is a block diagram illustrating an example evaluation system in accordance with some implementations of the present disclosure.

FIG. 1 illustrates an example evaluation system 100 for evaluating network load during execution of one or more transactions. This system 100 generally involves or executes a network monitoring tool that is capable of load generating and processing. For example, the system 100 may execute a LoadRunner script that includes an algorithm that extracts values that track upstream and downstream values. Indeed, while the LoadRunner application is distributed by Hewlett Packard (acquired from Mercury Interactive upon information and belief), it is one of several performance and load testing product for examining system behavior and performance while generating actual network load; thus any appropriate network or load monitoring tool may be used and is considered within the scope of the disclosure. In some implementations, the LoadRunner or other network monitoring application may emulate hundreds or thousands of concurrent users (or application instances) and/or transactions in order to collect information from infrastructure components. Native LoadRunner variables help provide an overall network load after transactions are executed. In some implementations, the system 100 tracks values of variables transmitted between a device and an application as transactions are executed. In other words, the system 100 may modify one or more native LoadRunner variables to track upstream and downstream values for network load in addition to overall network load. Specifically, the system 100 may include transmitted and received data in a single native LoadRunner variable to track substantially all data communicated when emulating users executing transactions. In tracking the values transmitted during execution, the system 100 may maximize, enhance or otherwise increase details of evaluating actual network load when executing transactions to provide a clearer picture of actual network load. Indeed, the techniques disclosed herein can often help distinguish between cached and non-cached content to compute the precise amount of bytes that goes to and forth between the server.

In the illustrated implementation, the system 100 includes a server 102, clients 104a-c, and an evaluation device 106 communicably coupled through a network 108. The server 102 may execute or replicate one or more applications 110a-c to provide services to a plurality of users. In some implementations, the one or more applications 110a-c may process bulk transactions such as, for example, census, industry and consumer statistics, enterprise resource planning (ERP), financial transaction processing, and/or other bulk processes. Indeed, the applications 110 may each represent a particular web browser conducting network transactions with a web server, such as server 102. The evaluation device 106 includes a monitoring engine 114 for tracking transactions executed by the clients 106, transaction files 116 for identifying data associated with previously-executed transactions, a LoadRunner program 118 for executing scripts to evaluate system performances, a LoadRunner script 120 for emulating users executing transactions, emulation files 122 for identifying information associated with the emulated users, reports 124 for identifying results of the evaluation processes, and a Graphical User Interface (GUI) 126.

As mentioned above, the system 100 includes, invokes, executes, references, or is communicably coupled with the server 102. The server 102 can include any software, hardware, and/or firmware configured to execute transactions using the applications 110. For example, the server 102 may be a computing device that executes transactions from thousands of users such as, for example, financial transactions (e.g., ATM transactions). In this example, the server 102 may support hundreds or thousands of users simultaneously. Typically, the server 102 can be used by large, complex organizations (e.g., financial institutions) to continuously sustain many simultaneous transactions and/or communicate with a plurality of devices. In some implementations, the server 102 may be a computer from or otherwise compatible with the IBM System/360 line (e.g., IBM System z10). For example, server 120 may be a Java 2 Platform, Enterprise Edition (J2EE)-compliant application or web server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 120 that may be used with the disclosure, system 100 can be implemented using computers other than servers, as well as a server pool. Indeed, server 120 may be any computer or processing device such as, for example, a blade server, general-purpose personal computer (PC), web server, Windows Server, Unix-based computer, or any other suitable device. In other words, the present disclosure contemplates computers other than general purpose computers, as well as computers without conventional operating systems. Server 120 may be adapted to execute any operating system including Linux, UNIX, Windows Server, or any other suitable operating system.

In some configurations, the server 102 includes or is otherwise associated with one or more databases (not illustrated) accessed through, for example, EBCDIC hex messages. In the illustrated implementation, the server 102 can execute the applications 110a-c at any appropriate time such as, for example, in response to a request or input from the client 104 or any appropriate computer system coupled with network 108. The application 110 is any suitable application software running on the server 102 such as any general application that process bulk transactions. For example, the applications 110a-c may support a plurality of users (e.g., thousands) submitting a plurality of transactions (e.g., millions of transactions per day). In some implementations, a financial institution (not illustrated) may use the applications 110a-c to processes transactions associated with financial instruments (e.g., credit cards, checks). These example applications 110 may execute one or more of the following: receive data from the client 104 encoding one or more transaction requests; execute the transactions in accordance with the requests; transmit data to the client 104 encoding responses to the transaction requests; and/or other operations. The applications 110a-c may be based on any suitable programming language such as C.

The client 104a-c is any devices (e.g., computing devices) operable to connect or communicate with the network 108 using any communication link. The client 106 includes, executes, or otherwise presents a GUI 112 and comprises an electronic device operable to receive, transmit, process and store any appropriate data associated with system 100. While the illustrated implementation includes the client 106, the system 100 may include any number of clients 106 communicably coupled to the network 108. Further, "client 106," "tester," and "user" may be used interchangeably as appropriate. Moreover, for ease of illustration, the client 106 is described in terms of being used by one user. But many users may use one device or one user may use multiple devices.

As used in this disclosure, a user of client 106 is any person, department, organization, small business, enterprise, or any other entity that may use or request others to use system 100. Client 106 is intended to encompass a personal computer, touch screen terminal, workstation, network computer, kiosk, wireless data port, smart phone, personal data assistant (PDA), one or more processors within these or other devices, or any other suitable processing or electronic device used by a user viewing content from the network 108. For example, the client 106 may be a PDA operable to wirelessly connect with an external or unsecured network. In another example, the client 106 may comprise a laptop that includes an input device, such as a keypad, touch screen, mouse, or other device that can accept information, and an output device that conveys information associated with evaluation data of the mainframe, including digital data, visual information, or GUI 112. Both the input device and output device may include fixed or removable storage media such as a magnetic computer disk, CD-ROM, or other suitable media to both receive input from and provide output to users of the client 106 through the display, namely the client portion of GUI 112.

The GUIs 112 and 126 comprises a graphical user interface operable to allow the user of the client 106 to interface with at least a portion of the system 100 for any suitable purpose, such as presenting evaluation reports 124. Generally, the GUI provides the particular user with an efficient and user-friendly presentation of data provided by or communicated within system 100. The GUI may comprise a plurality of customizable frames or views having interactive fields, pull-down lists, and buttons operated by the user. For example, the GUI may be operable to display transaction information in a user-friendly form based on the user context and the displayed data. The GUI can be configurable, supporting a combination of graphical elements (e.g., fields, buttons), to present the user interface of the application 120. The term graphical user interface may be used in the singular or in the plural to describe one or more graphical user interfaces and each of the displays of a particular graphical user interface. The GUI may be any graphical user interface, such as a generic web browser (Internet Explorer) or touch screen, that processes information in the system 100 and efficiently presents the results to the user. For example, it may represent a front end for any illustrated or unillustrated software application.

The evaluation device 106 can include any software, hardware, and/or firmware configured to emulate a plurality of different users executing transactions with the application 110. In the illustrated implementation, the evaluation device 106 includes the monitoring engine 114, the transaction files 116, the LoadRunner application 118, the LoadRunner script 120, the emulation files 122, and the reports 124. The monitoring engine 114 is any software, hardware, and/or firmware that tracks one or more transactions executed by the clients 104. For example, the monitoring engine 114 may identify a transaction with the application 110 in response to at least an event and store information communicated between the client 104 and the application 110. In some implementations, the monitoring engine 114 may execute one or more of the following: identify an event in response to at least criteria being satisfied; determine values communicated between the client 104 and the application 110; store the communicated values in one or more transaction files 116; and/or others. In identifying an event, the monitoring engine 114 may determine transactions exceed a specified threshold. For example, the monitoring engine 114 may determine that the clients 104 have executed a specified transaction type a certain number of times that has exceed a specified threshold. Criteria may include a number of transactions, a number of errors, an execution time, a user request, execution of garbage collections, error during request processing, error during data transfer, error during rendering on the client, method calls on the server and/or client, deadlocks on the server, and/or other criteria. In response to at least determining or otherwise identifying one or more events, the monitoring engine 114 may track values of variables transmitted between the clients 104 and the application 110. For example, the client 104 may transmit values for one or more parameters to the application 110, and in response to the transmitted values, the application 110 may generate values for one or more parameters and transmit these values to the client 104. In this example, the monitoring engine 114 may identify at least a portion of the upstream values and the downstream values, i.e., values transmitted to and received from the application 110. In some implementations, the monitoring engine 114 identifies substantially all values associated with network load communicated between the client 104 and the application 110. In addition, the monitoring engine 114 may track data not directly transmitted between the client 104 and the application 110. For example, the monitoring engine 114 may track data transmitted to a third device during an executed transaction. In some implementations, the monitoring engine 114 may generate or at least update transaction files 116 based, at least in part, on the identified values and/or other data. This monitoring engine 114 may combine, condense, or otherwise aggregate values associated with a single client 104, multiple clients 104, a single transaction, multiple transactions, and/or other aspects of the system 100. For example, the monitoring engine 114 may determine values associated with a particular type of transaction and aggregate the values for at least a portion of the determined values.

The transaction files 116 includes one or more entries or data structures that information associated with transaction executed by the application 110. For example, the transaction file 116 may include information associated with a transaction previously executed with the application 110 including values of variables between the application 110 and the client 104. In some implementations, the transaction file 116 may include or otherwise identify one or more of the following: transaction type, date, time, a session IDentifier (ID), a user ID, a delay time, an individual request size, individual response size, roundtrip, network throughput, amount of memory freed by garbage collector, time taken by garbage collector, time taken by server processing, time taken by data base processing, number of active users, number of locks created, amount of time waited at locks, CPU load caused per user, memory consumed processing one user request, number of processes running and/or other information associated with a previously-executed transaction. In some implementations, the transaction file 116 can include aggregated transaction data that, for example, is associated with multiple transactions, multiple clients 104, and/or other aspects of the system 100. The transaction files 116 may be associated based, at least in part, on any suitable criteria. For example, the transaction files 116 may be associated based on one or more of the following: a specific client 104, a user, a transaction type, a period of time, and/or other suitable criteria associated with a transaction and/or client 104.

The LoadRunner application 118 is a software application currently distributed by HP that evaluates and/or predicts behavior and performance of systems, which was previously distributed by Mercury Interactive. For example, the LoadRunner application 118 may evaluate response times, number of transactions handled, load from transactions, and/or other aspects of systems. The LoadRunner application 118 includes the following tools: a Virtual User Generator (VuGen) to capture end-user business processes and generate a performance testing script; a controller to organize, drive, manage, and/or monitor load tests; load generators to generate the load by running virtual users; an analysis to view, dissect, and compare performance results; a launcher to provide an access point for the user of the LoadRunner application 118; and others. In some implementations, the LoadRunner application 118 can emulate hundreds or thousands of concurrent users to apply production workloads to systems while identifying performances of key elements in the system being evaluated. As mentioned above, any network or load monitoring tool may be appropriate and be within the scope of the disclosure.

The LoadRunner script 120 can include a script processable by the LoadRunner application 118. For example, the script 120 may be written in any suitable language processable by the LoadRunner application 118, such as C. As with the application, it will be understood that "LoadRunner script" is for example purposes only and includes other lists, parameter strings, or scripts generated, processed, or otherwise compatible with other network or load monitoring tools, modules, or applications. For example, the script 120 may include hex data in any suitable format processable by the application 110 such as ASCII. In some implementations, the script 120 can include three sections such as an initialization, action and/or validation section. During execution, the initialization section may initialize the variables, the action section may execute one or more transactions, and the validation section may validate values returned by the applications 110. In regards to initialization, the executed script 120 may identify values in the transaction files 116 and populate variables with initial values including the identified data. In other words, the script 120 may populate variables with values from transactions previously executed by the clients 104 and stored or otherwise identified by the transaction file 116. In these implementations, the script 120 may use actual transaction data to emulate a plurality of users executing transactions. In regards to the action section, the executed script 120 may generate one or more commands compatible with the application 110 such that the commands execute one or more transactions. For example, the executed script 120 may generate a request to check a credit limit in a specific bank account such that the request is compatible with the application 110. For instance, one script may include, call, execute, or otherwise involve functions that generally implement functionality similar to the following example functions:

```
sapnwperf_request_length( ) {
    // local variables
    int l;
// response header length
    int L; //
response content length
    char *p; //
pointer in header string
    char *r;
// response header string
    // get the header and content string
    r = lr_eval_string(RequestHeaderParameter);
    // we are done if there is no request header (this is generally
the case for the first call)
    // the value "no value" is indicated by the parameter name being
returned as value
    if ((strcmp(r, RequestHeaderParameter)) == 0) {
        return 0;
    }
    // GETs have a no content, POSTs do
    if ((strncmp(r, "GET", 3)) == 0) {
        // compute the request header and content length
        l = strlen(r);
        L = 0;
    }
    else {
        // find the position of the Content-length field; we are
done if there is none
        p = (char *) strstr(r, ContentLengthHeader);
        if (p < r) {
```

-continued

```
        lr_error_message("No post content length");
        return 0;
    }
    // advance to the Content-length value
    p = p + sizeof(ContentLengthHeader);
    // compute the request header and content length
    l = strlen(r);
    L = atoi(p);
}
    // generate the user data points
    lr_user_data_point("Request header length [B]",    (double) l);
    lr_user_data_point("Request content length [B]",   (double) L);
    lr_user_data_point("Request length [B]",           (double) (l +
L));
    return 0;
}
sapnwperf_response_length( ) {
    // local variables
    int l;
// response header length
    int L; //
response content length
    char *r;
// response header string
    char *R;
// response content string
    // get the header and content string
    r = lr_eval_string(ResponseHeaderParameter);
    R = lr_eval_string(ResponseContentParameter);
    // we are done if there is no response header (this indicates a
response from the cache)
    // the value "no value" is indicated by the parameter name being
returned as value
    if ((strcmp(r, ResponseHeaderParameter)) == 0) {
        return 0;
    }
    // we are done if there is no response content (generally the
case during the first run)
    // the value "no value" is indicated by the parameter name being
returned as value
    if ((strcmp(R, ResponseContentParameter)) == 0) {
        return 0;
    }
    // compute the response header and content length
    l = strlen(r);
    L = strlen(R);
    // generate response header, content and overall length data
points
    lr_user_data_point("Response header length [B]", l);
    lr_user_data_point("Response content length [B]", L);
    lr_user_data_point("Response length [B]",          (double) (l +
L));
    return 0;
}
sapnwperf_length( ) {
    // evaluate the lengthes
    sapnwperf_request_length( );
    sapnwperf_response_length( );
    // reset the parameters to avoid double reporting if match fails
    lr_save_string(RequestHeaderParameter,
RequestHeaderParameterName);
    lr_save_string(ResponseHeaderParameter,
ResponseHeaderParameterName);
    lr_save_string(ResponseContentParameter,
ResponseContentParameterName);
    // register next matching attempts
    web_save_header(REQUEST,    RequestHeaderParameterName);
    web_save_header(RESPONSE,   ResponseHeaderParameterName);
    web_reg_save_param(ResponseContentParameterName,
"LB=", "RB=", "Search=Noresource", LAST);
    return 0;
}
```

It will be understood that the forgoing is for illustration purposes and is not meant to limit the scope of the disclosure. Put differently, the above example script is meant to help provide context and description and other scripts may implement functions and functionality disparate from it while remaining within the scope of the disclosure.

As for the validation section, the executed script 120 may include validation points to verify values received from the application 110. The validation points may include a range, an upper threshold, a lower threshold, other values, and/or mathematical and/or logical expressions. For example, the executed script 120 may verify that a returned value is within a range. In response to at least determining a violation of a validation point, the executed script 120 may generate an error code identifying the specific error in the returned value.

The emulation files 122 includes one or more entries or data structures that include or otherwise identify information associated with emulating user transactions. For example, the emulation files 122 may include information associated with the LoadRunner script 120 emulating a plurality of users executing a plurality of transactions with the application 110, including values of variables between the application 110 and the executed LoadRunner script 120. In some implementations, the emulation file 122 may include or otherwise identify one or more of the following: transaction type, a number of transactions, a number of emulated users, date, time, a session IDentifiers (IDs), a user IDs, delay times, individual request sizes, individual response sizes, roundtrips, network throughputs, requests satisfied from cache, size of requests satisfied from cache, compression factor of transferred data, size of header data vs. size of "payload" data, ratio between the two values above, number of identical and/or other information associated with the emulated users. In some implementations, the emulation files 122 can include aggregated transaction data that, for example, is associated with multiple transactions, multiple emulated users, and/or other aspects of the system 100. The emulation files 122 may be associated based, at least in part, on any suitable criteria. For example, the emulation files 122 may be associated based on one or more of the following: a user, a transaction type, a period of time, a number of emulated users, and/or other suitable criteria associated with transactions and/or the executed LoadRunner script 120.

Based, at least in part on evaluation data, the reports 124 include one or more entries or data structures that identifies information associated with tracking the emulation of users executing transactions with the application 110. For example, the report 124 may identify executed transactions, response times, error codes and/or other data for displaying through the GUI 126. In some implementations, the report 124 may be based on or otherwise associated with one or more of the following criteria: a specific transaction type, a specific application 110, the server 102, a specific emulated user, one or more emulation files 122, and/or other information. In some implementations, the report 124 can include aggregated transaction numbers and response times for display through the GUI 126. The results array per each virtual user per each iteration may create a set of files for a specific performance test that can be used to generate graphs of the tests results.

In general, the transaction files 116, the emulation files 122, and the reports 124 may be stored in any suitable format such as, for example, an eXtensible Markup Language (XML) document, a flat file, comma separated value (CSV) file, a name-value pair file, SQL table, or others. Indeed, each transaction files 116, the emulation files 122, and the reports 124 may be a temporary or a persistent data structure without departing from the scope of the disclosure. The transaction files 116, the emulation files 122, and the reports 124 may be created, updated, or supplied by computer 120, a third-party software vendor, or any appropriate user of any computer in system 100, loaded from a default profile, or received via network 108.

Regardless of the particular implementation, "software" may include computer-readable instructions, firmware, wired or programmed hardware, or any combination thereof on tangible medium as appropriate. Indeed, the monitoring engine 114, the LoadRunner application 118, and the LoadRunner script 120 may be written or described in any appropriate computer language including C, C++, Java, J#, Visual Basic, assembler, Perl, any suitable version of 4GL, as well as others. While the monitoring engine 114, the LoadRunner application 118, and the LoadRunner script 120 are illustrated in FIG. 1 as including individual modules, each of the monitoring engine 114, the LoadRunner application 118, and the LoadRunner script 120 may include numerous other submodules or may instead be a single multi-tasked module that implements the various features and functionality through various objects, methods, or other processes. Further, while illustrated as internal to the evaluation device 106, one or more processes associated with the monitoring engine 114, the LoadRunner application 118, and the LoadRunner script 120 may be stored, referenced, or executed remotely. Moreover, the monitoring engine 114, the LoadRunner application 118, and the LoadRunner script 120 may be a child or sub-module of another software module or enterprise application (not illustrated) without departing from the scope of this disclosure.

Network 108 facilitate wireless or wireline communication between server 102 and any other local or remote computer, such as clients 104. Network 108 may be all or a portion of an enterprise or secured network. While illustrated as single network, network 108 may be a continuous network logically divided into various sub-nets or virtual networks without departing from the scope of this disclosure, so long as at least portion of network 108 may facilitate transactions between server 102 and at least one client 104. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect, the monitoring engine 114 may identify a transaction executed between the server 102 and the client 104. In connection with identifying the transaction, the monitoring engine 114 may store values of variables transmitted between the server 102 and the client 104 in one or more transaction files 116. In the connection with executing the LoadRunner script 120, values of variables from the previously-executed transactions stored in the transaction files 116 may be populated in one or more native LoadRunner variables. The executed script 120 may include an algorithm that identifies values transmitted between the application 110 and the script 120 during execution of the emulated transactions. Based, at least in part, on these values, the reports 122 may identify details of the network load while emulating the users executing transactions.

Figure 2F:
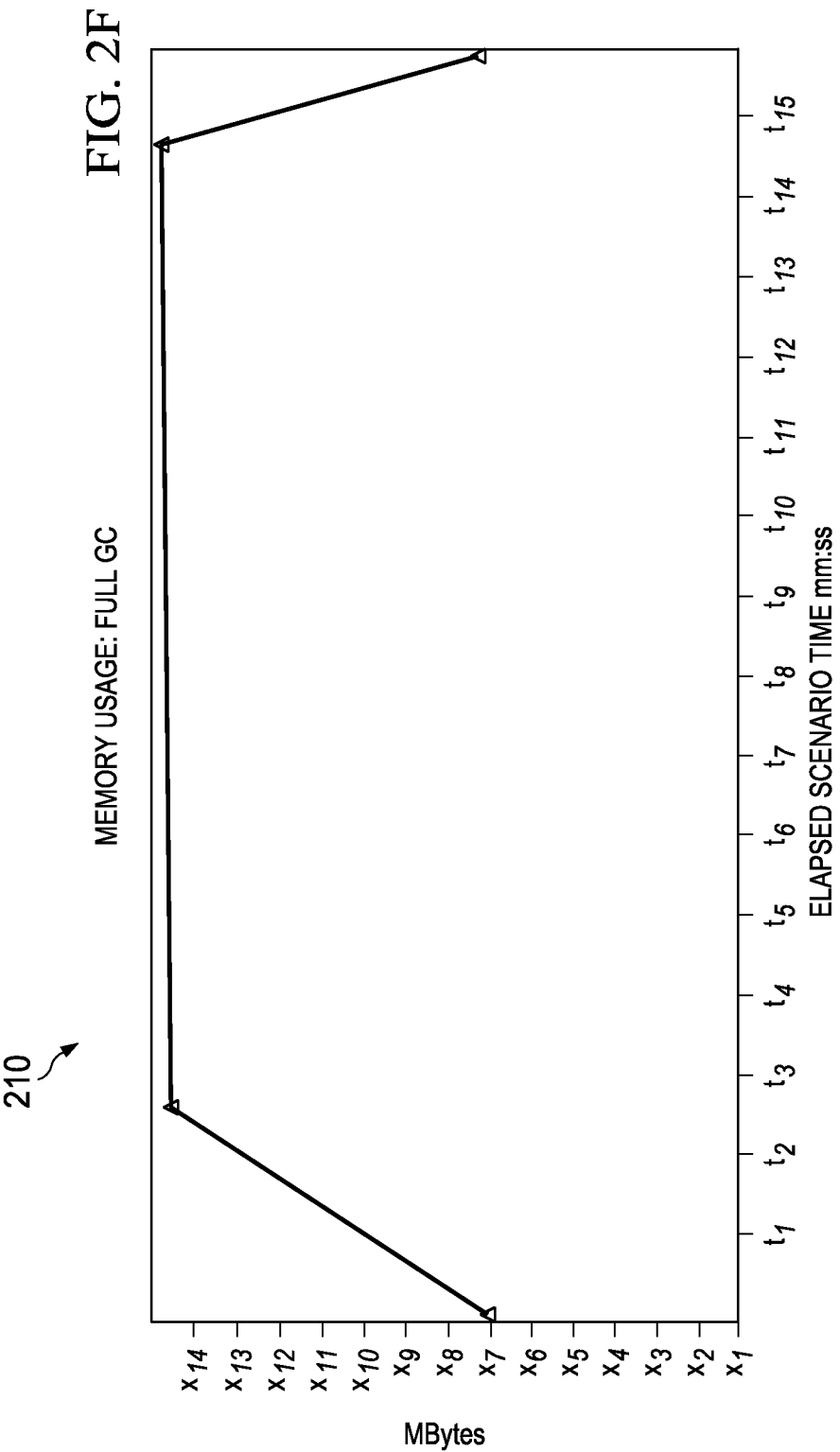
FIGS. 2A-2Z, and 2AA-2AF illustrate example graphs presenting evaluation results of the system in FIG. 1.
Figure 2H:
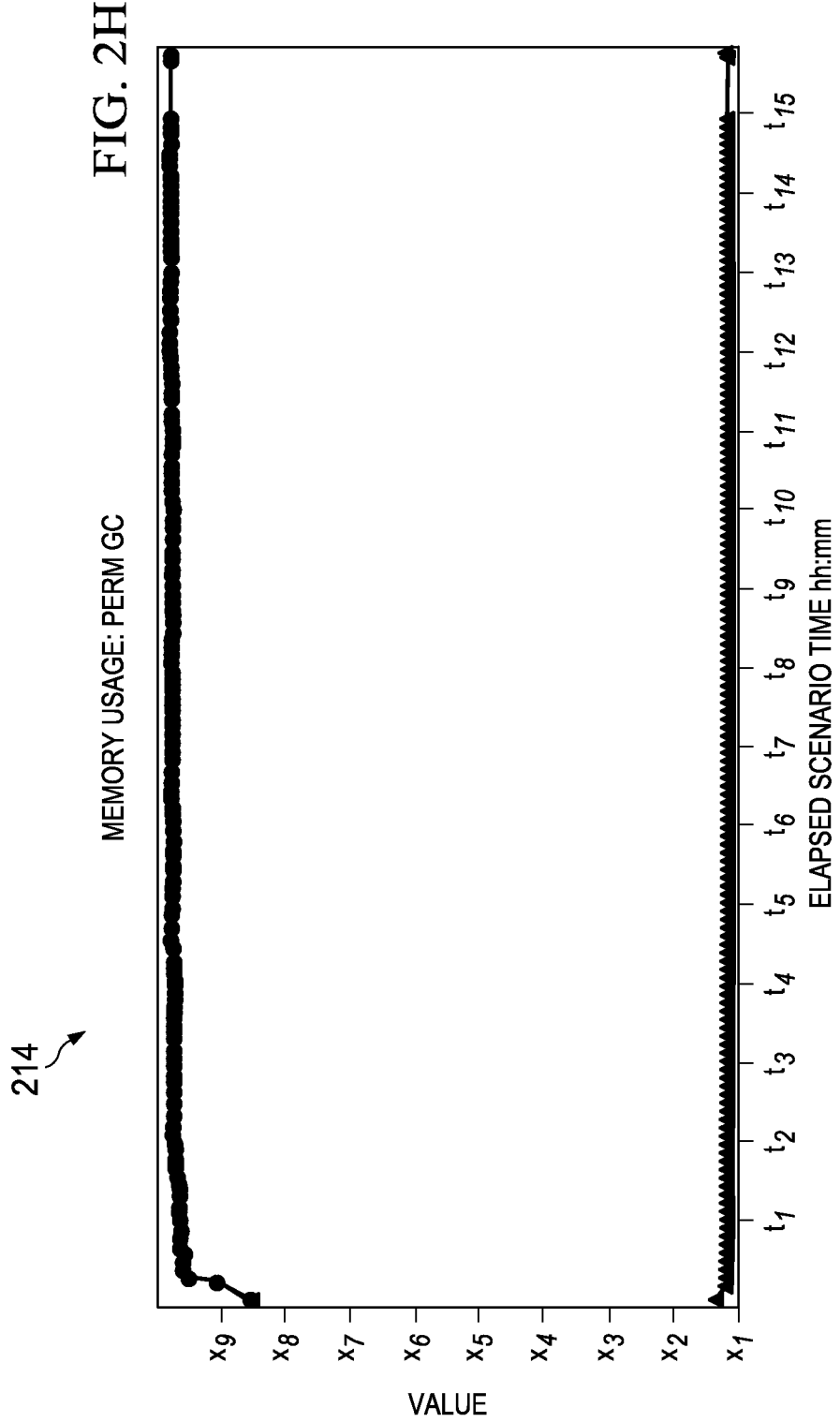
Figure 2K:
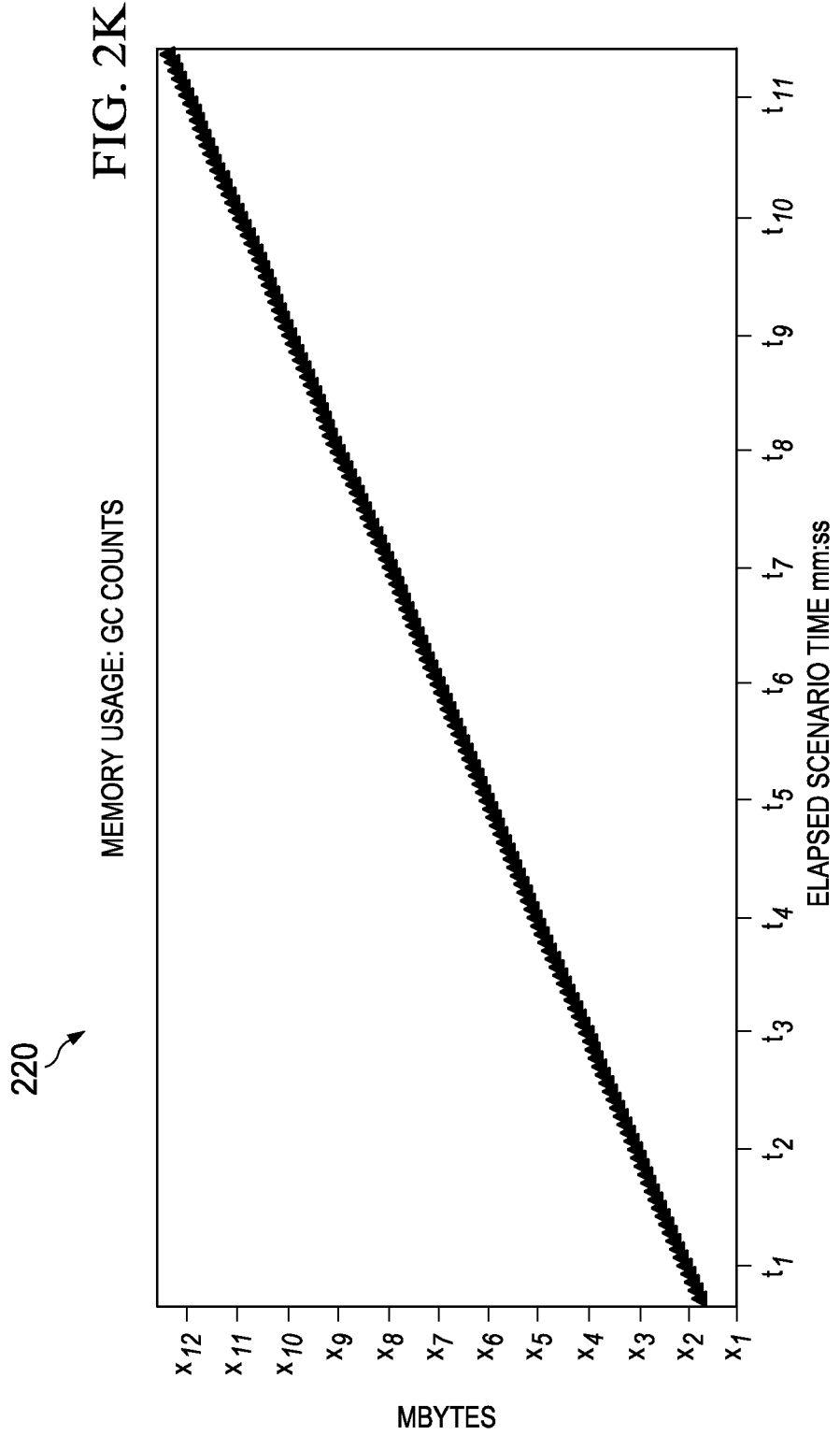
Figure 2L:
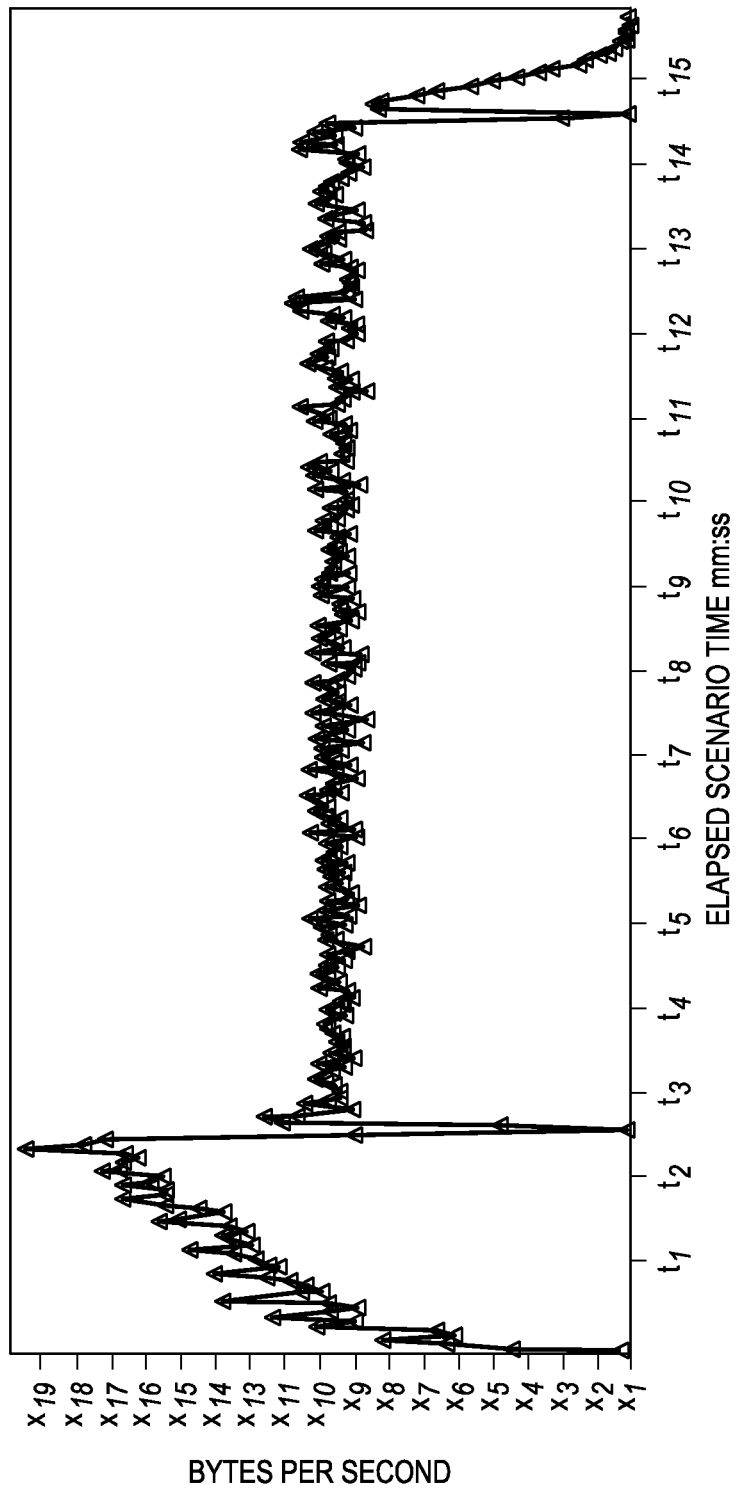
Figure 2N:
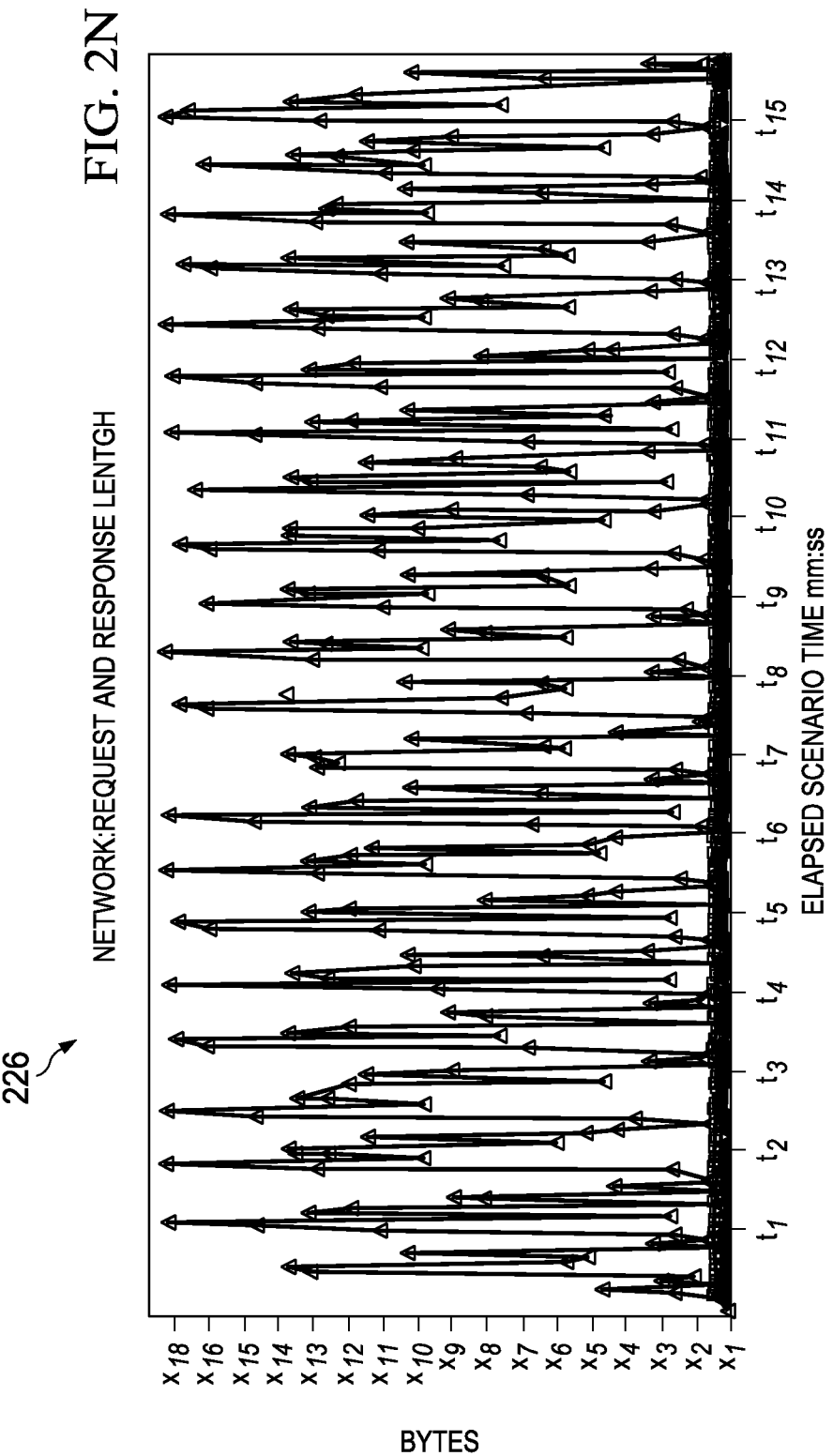
Figure 2W:
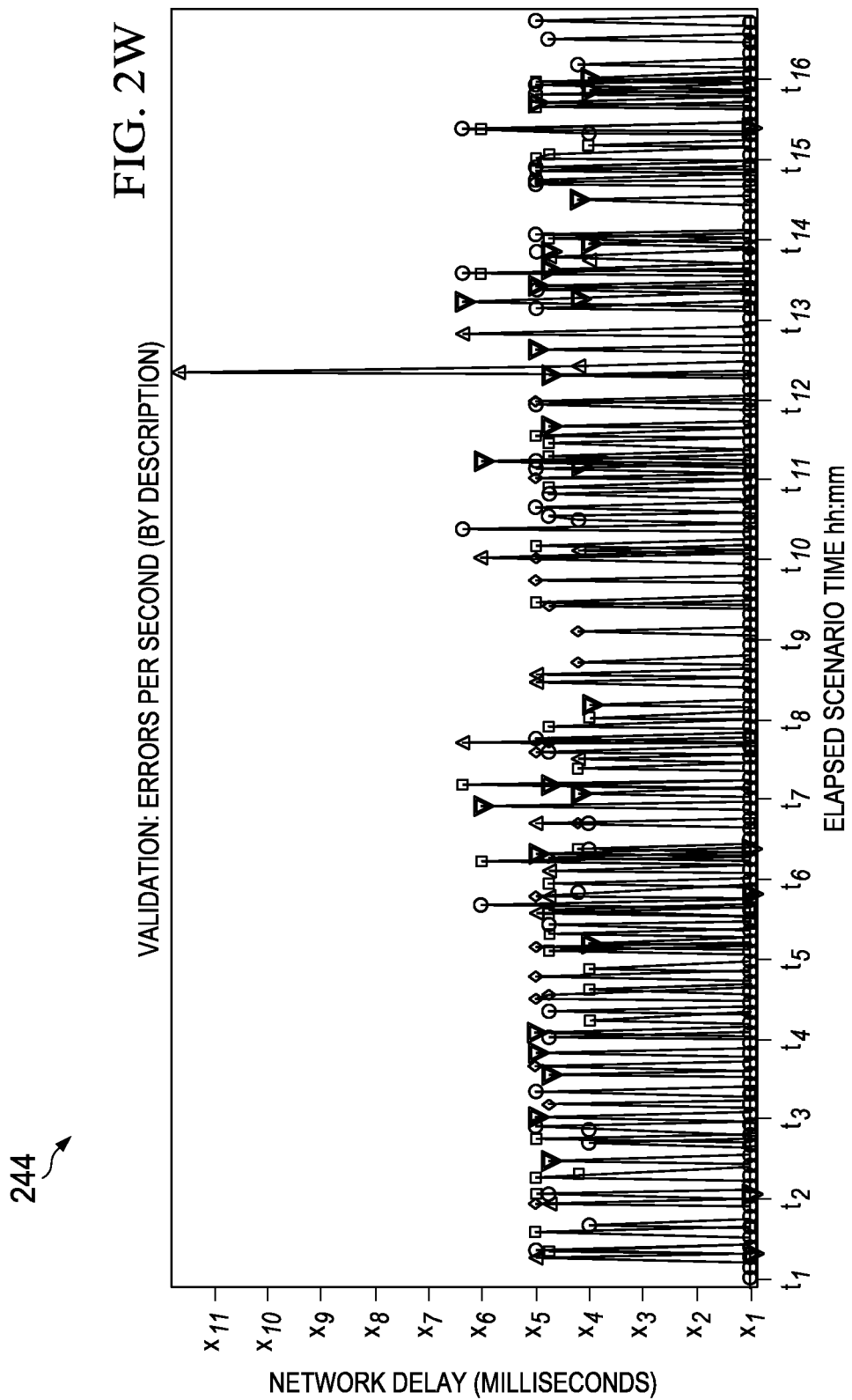
Figure 2A:
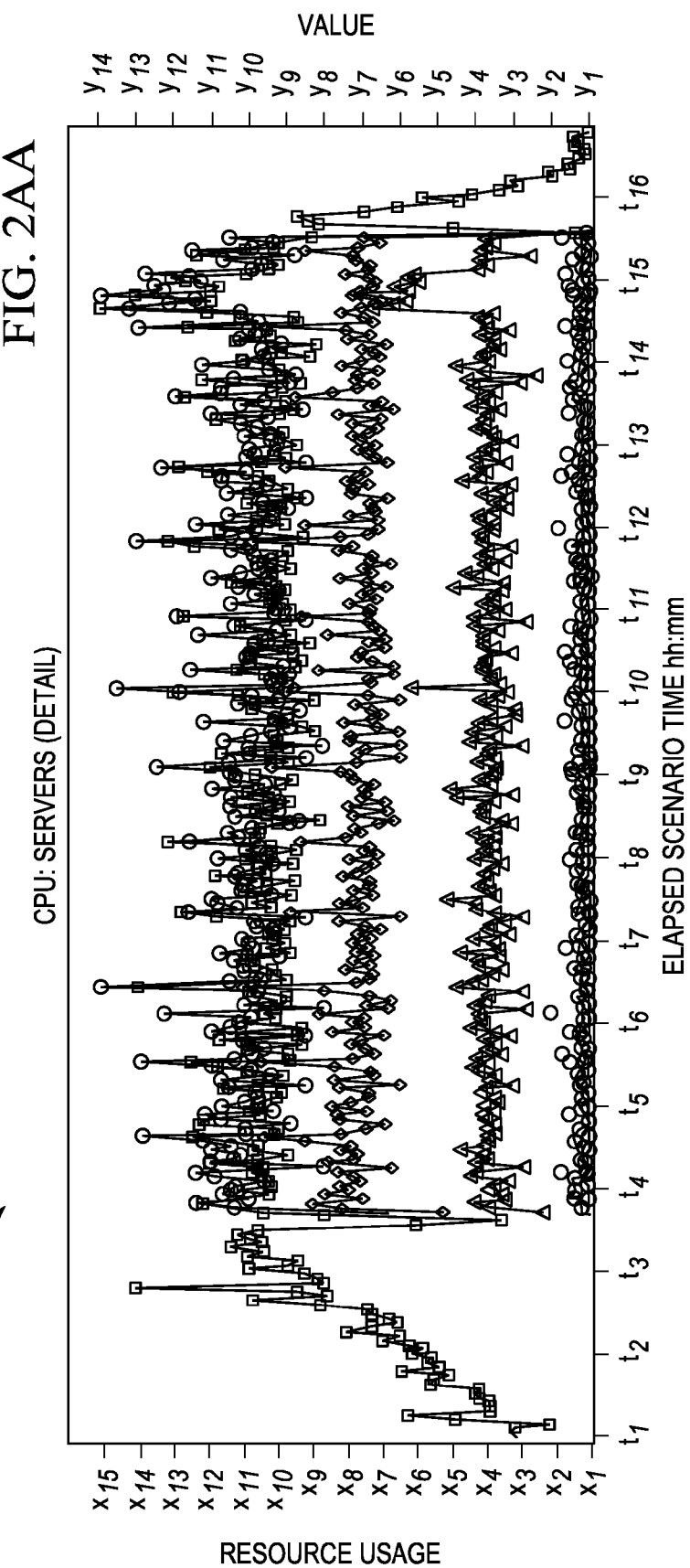
Figure 2A:
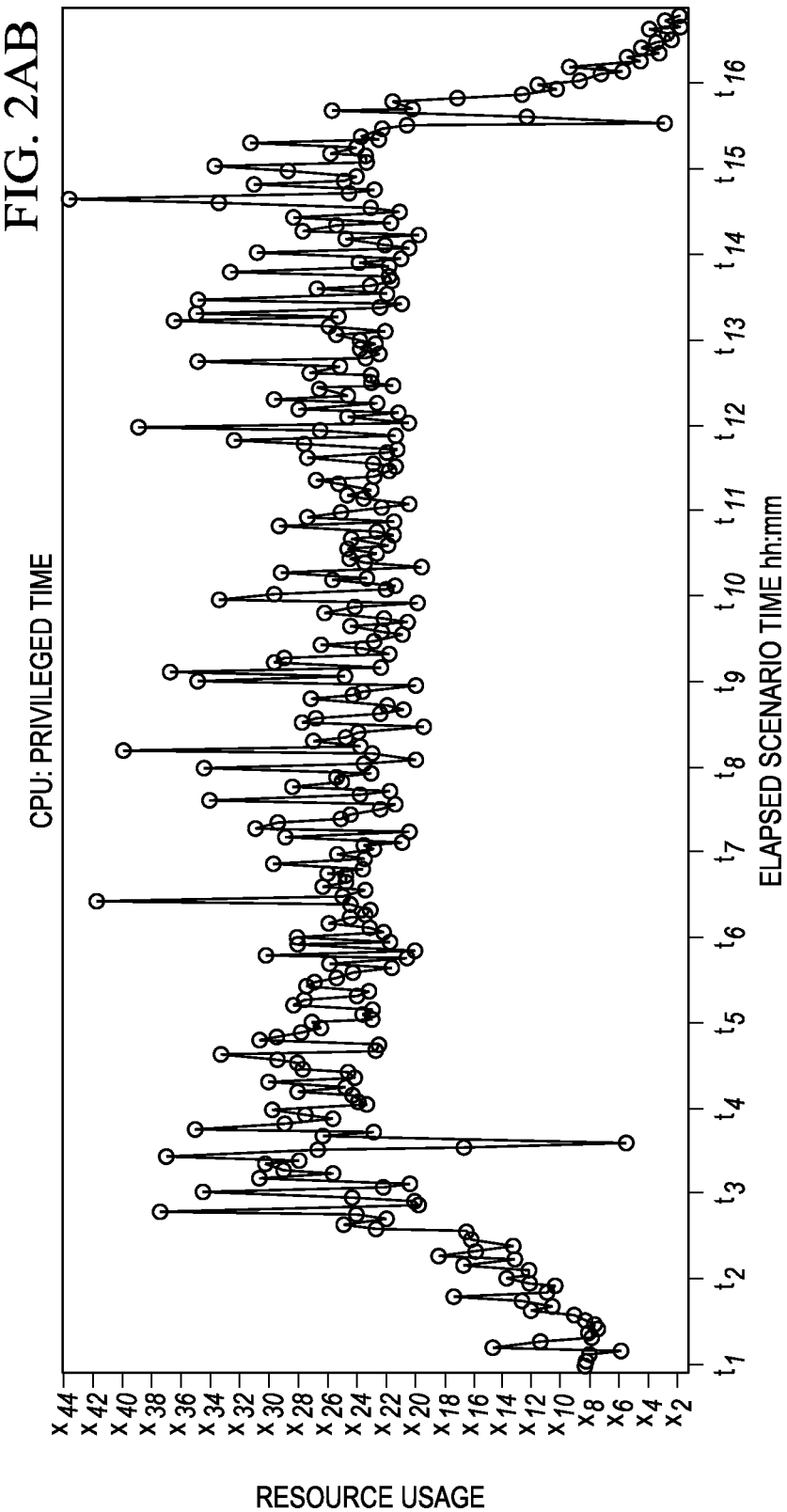
Figure 2A:
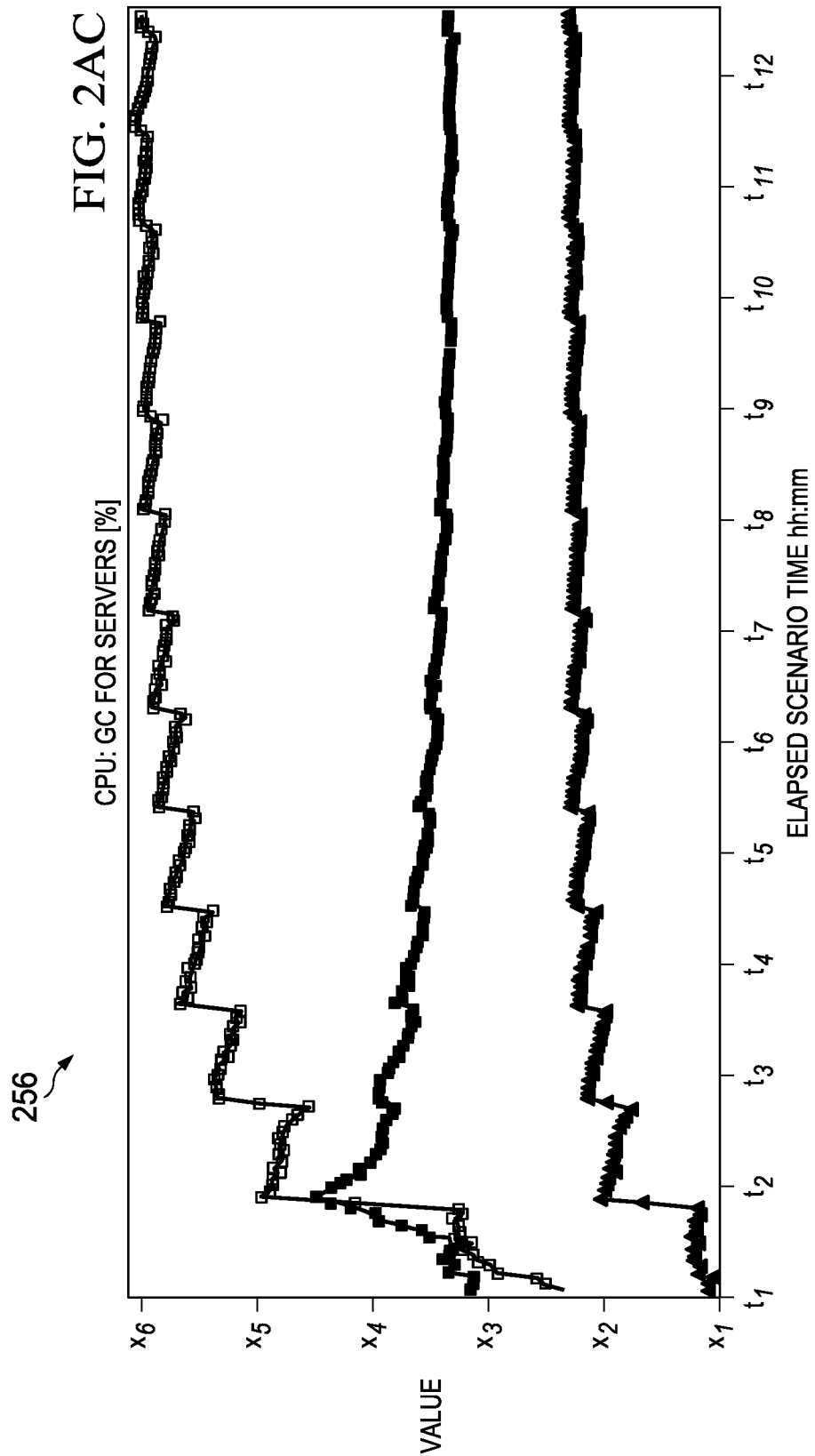
Figure 2A:
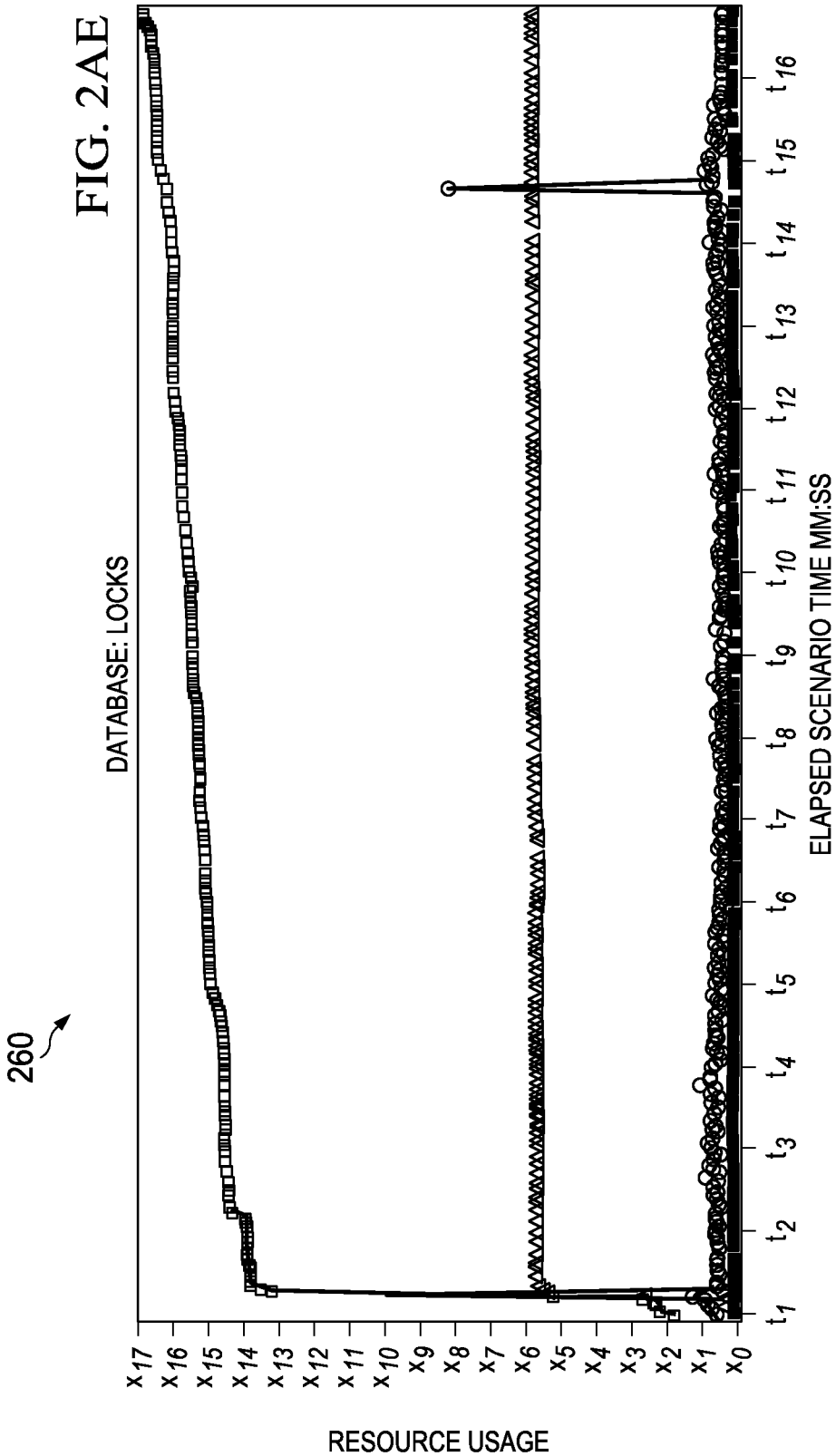
Figure 2A:
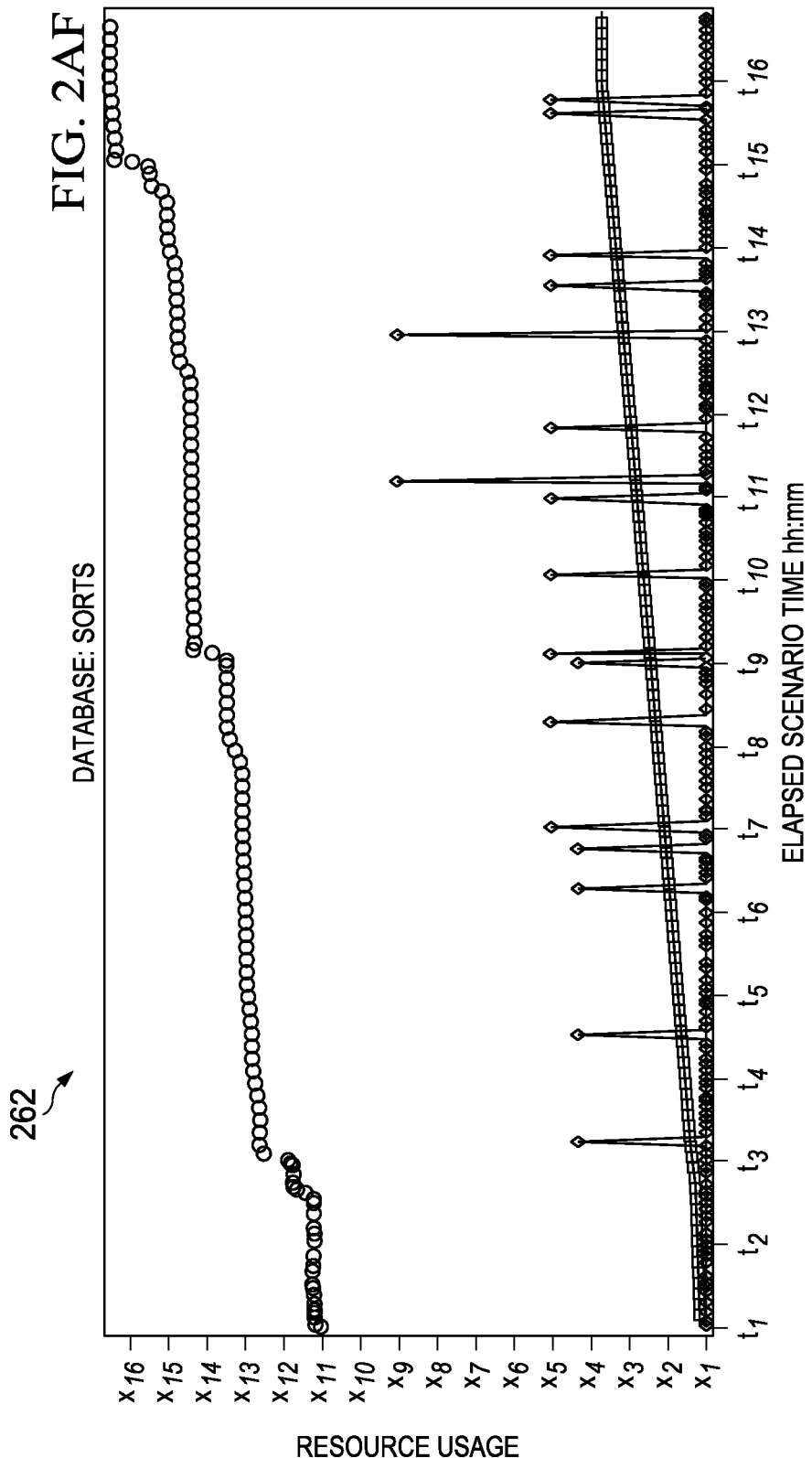

FIGS. 2A-2AF illustrate example graphs 200-262 based, at least in part, on information associated with emulated users executing transactions with the application 110 of FIG. 1. Though, the illustrated graphs 202-262 are for example purposes only. Accordingly, the GUI 126 may include, generate, display, communicate, or otherwise present some, none, or all of the graphs 202-262 without departing from the scope of this disclosure.

Referring to FIG. 2A, the graph 200 illustrates the average time taken to perform transactions during each second of a load test. The graph 200 may assist in determining whether the performance of the server 102 is within acceptable minimum and maximum transaction performance time ranges defined for the system 100. Referring to FIG. 2B, the graph 202 illustrates the percentage of transactions that were executed within a given time range. The graph 202 may assist in determining the percentage of transactions that meet the performance criteria defined for the system 100. Referring to FIG. 2C, the graph 204 illustrates a summary of the DB2 Resources for input and output database. Referring to FIG. 2D, the graph 206 illustrates a summary for a summary of the DB2 Resources for other databases. Referring to FIG. 2E, the graph 208 illustrates the y-axis against the x-axis for the user data points that were defined in the online monitor for minor GC. Referring to FIG. 2F, the graph 210 illustrates the y-axis against the x-axis for the user data points that were defined in the online monitor for minor GC. Referring to FIG. 2G, the graph 212 illustrates the y-axis against the x-axis for the user data points that were defined in the online monitor for Conc GC. Referring to FIG. 2H, the graph 214 illustrates the y-axis against the x-axis for the user data points that were defined in the online monitor for Perm GC. Referring to FIG. 2I, the graph 216 illustrates the y-axis against the x-axis for the user data points that were defined in the online monitor for base memory usage. Referring to FIG. 2J, the graph 218 illustrates the y-axis against the x-axis for the user data points that were defined in the online monitor for memory per transaction.

Referring to FIG. 2K, the graph 220 illustrates the y-axis against the x-axis for the user data points that were defined in the online monitor for GC counts. Referring to FIG. 2L, the graph 222 illustrates the amount of throughput (in bytes) on the server 102 during the load test. Throughput may represent the amount of data that the users received from the server 102 at any given second. The graph 222 may assist in evaluating the amount of load users generate, in terms of server throughput. Referring to FIG. 2M, the graph 224 illustrates the total number of completed transactions (both successful and unsuccessful) performed during each second of a load test. The graph 224 may assist in determining the actual transaction load on the system 100 at any given moment. Referring to FIG. 2N, the graph 226 illustrates the y-axis against the x-axis for the user data points that were defined in the online monitor for request and response lengths. Referring to FIG. 2O, the graph 228 illustrates the y-axis against the x-axis for the user data points that were defined in the online monitor for request and response length per transaction. Referring to FIG. 2P, the graph 230 illustrates the y-axis against the x-axis for the user data points that were defined in the online monitor for roundtrips per transactions. Referring to FIG. 2Q, the graph 232 illustrates a summary of the system resources usage for each UNIX based host. Referring to FIG. 2R, the graph 234 illustrates a summary of the System Resources usage for each UNIX based host. Referring to FIG. 2S, the graph 236 illustrates the y-axis against the x-axis for the user data points that were defined in the online monitor for CPU load per user. Referring to FIG. 2T, the graph 238 illustrates a summary of the system resources usage for each Windows based host. Referring to FIG. 2U, the graph 240 illustrates the number of users that executed scripts and their status during each second of a load test. The graph 240 may assist in determining the user load on the server 102 at any given moment.

Referring to FIG. 2V, the graph 242 illustrates the average number of errors that occurred during each second of the scenario run, grouped by error code and error message. Referring to FIG. 2W, the graph 244 illustrates the delays for the complete path between the source and destination machines. Referring to FIG. 2X, the graph 246 illustrates resource usage of the CPU of the server 102. Referring to FIG. 2Y, the graph 248 illustrates a summary of the system resources usage for each UNIX based host. Referring to FIG. 2Z, the graph 250 illustrates the y-axis against the x-axis for the user data points that were defined in the online monitor. Referring to FIG. 2AA, the graph 252 illustrates resource usage of the CPU of the server 102. Referring to FIG. 2AB, the graph 254 illustrates a summary of the system resources usage for each UNIX based host. Referring to FIG. 2AC, the graph 256 illustrates the y-axis against the x-axis for the user data points that were defined in the online monitor for GC for servers. Referring to FIG. 2AD, the graph 258 illustrates a summary of the system resources usage for each UNIX based host. Referring to FIG. 2AE, the graph 260 illustrates a summary of the DB2 Resources. Referring to FIG. 2AF, the graph 262 illustrates a summary of the DB2 Resources.

FIG. 3 is a flowchart illustrating an example method 300 for emulating users executing transactions in accordance with some implementations of the present disclosure. Examples of method 300 may be described in terms of the software environment 100. But it should be understood that any other suitable system or environment may also be used to perform, request, execute, or otherwise implement the method 300. In other words, method 300 contemplates using any appropriate combination and arrangement of logical elements implementing some or all of the described functionality.

Generally, the method 300 describes an example technique for using transaction data from a previously-executed transaction to emulate user executing a plurality of transactions. In doing so, the method 300 may identify values of variables transmitted between an application and device that LoadRunner scripts do not natively determine. In the illustrated example, method 300 includes the following two high level processes: (1) identifying values of variables between an application and an evaluation device in steps 302 to 308; and (2) generating load data for evaluation of the application by emulating users using the identified values. Illustrated method 300 begins at step 302 where values transmitted between an application and a client during execution of a transaction are identified. For example, the monitoring engine 114 of FIG. 1 may track values transmitted between the client 104 and the application 110 during execution of a transaction. At step 304, the identified values are stored in one or more transaction files. In the example, the monitoring engine 114 may store the downstream and upstream values in one or more transaction files 116. If an event is identified at decisional step 306, then, at step 308, a LoadRunner script is populated with the values of variables from a previously-executed transaction. Again in the example, the monitoring engine 114 may determine that one or more events have occurred based, at least in part, on values from the previous-executed transaction and, in response to at least determining the event, populate the LoadRunner script 120 with one or more of the identified values. In some implementations, the LoadRunner script 120 may be populated with the values during execution.

Turning to the evaluation process, a plurality of transactions are executed with the application using the stored values from the previously-executed transaction at step 310. As for the example, the LoadRunner script 120 may initialize variables with values stored in the transaction files 116 and emulate a plurality of users by executing transactions with the application 110 using the values. At step 312, values transmitted between the application and the executed LoadRunner script when executing the transactions are identified. Returning to the example, the executed LoadRunner script 120 may identify values of variables communicated between the executed LoadRunner script 120 and the application 110. Next, at step 314, the identified values for the executed plurality of transactions are stored, and at step 316, one or more reports are generated based, at least in part, on the one or more values identified from the emulation. In the example, the executed LoadRunner script 120 may generate one or more reports based, at least in part, on one or more emulation files 122.

The preceding figures and accompanying description illustrate processes and implementable techniques. But system 100 (or its other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, system 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer implemented method, comprising:
receiving a request to execute a plurality of transactions with an application of a server to evaluate one or more services using an executed LoadRunner script;
in response to the service request, automatically executing the plurality of transactions with the application using the LoadRunner script populated with values of variables transmitted between the application and a client during at least one transaction previously executed with the client;
determining upstream values and downstream values of the variables transmitted between the server application and the client during execution of the plurality of transactions; and
determining network load associated with the plurality of transactions based, at least in part, on the upstream values and the downstream values;
identifying the at least one transaction prior to the evaluation of the one or more services;
storing the values of the variables transmitted between the application and the client during execution of the at least one transaction;
populating one or more native LoadRunner variables with the values of the variables transmitted between the application and the client during execution of the at least one transaction.

2. The method of claim 1 further comprising generating one or more reports based, at least in part, on the determined values of the variables transmitted between the application and the executed LoadRunner script when emulating users executing the plurality of transactions.

3. The method of claim 1, wherein the variables include at least one of a delay time, an individual request size, an individual response size, a roundtrip, or a network throughput.

4. The method of claim 1, wherein the plurality of transactions emulate at least a hundred instances of the application.

5. The method of claim 1, wherein the determined values comprise substantially all values communicated between the application and the executed LoadRunner script.

6. A computer program product encoded on a non-transitory, tangible media, the product comprising computer readable instructions for causing at least one processor to perform operations comprising:
   receiving a request to execute a plurality of transactions with an application of a server to evaluate one or more services using an executed LoadRunner script;
   in response to the service request, automatically executing the plurality of transactions with the application using the LoadRunner script populated with values of variables transmitted between the application and a client during at least one transaction previously executed with the client;
   determining upstream values and downstream values of the variables transmitted between the server application and the client during execution of the plurality of transactions; and
   determining network load associated with the plurality of transactions based, at least in part, on the upstream values and the downstream values;
   identifying the at least one transaction prior to the evaluation of the one or more services;
   storing the values of the variables transmitted between the application and the client during execution of the at least one transaction;
   populating one or more native LoadRunner variables with the values of the variables transmitted between the application and the client during execution of the at least one transaction.

7. The computer program product of claim 6, the instructions further operable to perform instructions comprising generating one or more reports based, at least in part, on the determined values of the variables transmitted between the application and the executed LoadRunner script when emulating users executing the plurality of transactions.

8. The computer program product of claim 6, wherein the variables include at least one of a delay time, an individual request size, an individual response size, a roundtrip, or a network throughput.

9. The computer program product of claim 6, wherein the plurality of transactions emulate at least a hundred instances of the application.

10. The computer program product of claim 6, wherein the determined values comprise substantially all values communicated between the application and the executed LoadRunner script.

11. A system for enhancing network details, comprising:
    memory configured to store transmitted upstream values and downstream values;
    one or processors configured to:
       receive a request to execute a plurality of transactions with an application of a server to evaluate one or more services using an executed LoadRunner script;
       in response to the service request, automatically execute the plurality of transactions with the application using the LoadRunner script populated with values of variables transmitted between the application and a client during at least one transaction previously executed with the client;
       determine upstream values and downstream values of the variables transmitted between the server application and the client during execution of the plurality of transactions; and
       determine network load associated with the plurality of transactions based, at least in part, on the upstream values and the downstream values;
       identify the at least one transaction prior to the evaluation of the one or more services;
       store the values of the variables transmitted between the application and the client during execution of the at least one transaction;
       populate one or more native LoadRunner variables with the values of the variables transmitted between the application and the client during execution of the at least one transaction.

* * * * *